United States Patent
Hayasaki

(10) Patent No.: US 9,497,355 B2
(45) Date of Patent: Nov. 15, 2016

(54) IMAGE PROCESSING APPARATUS AND RECORDING MEDIUM FOR CORRECTING A CAPTURED IMAGE

(71) Applicant: SHARP KABUSHIKI KAISHA, Osaka-shi, Osaka (JP)

(72) Inventor: Makoto Hayasaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/410,278

(22) PCT Filed: May 31, 2013

(86) PCT No.: PCT/JP2013/065261
§ 371 (c)(1),
(2) Date: Dec. 22, 2014

(87) PCT Pub. No.: WO2014/002689
PCT Pub. Date: Jan. 3, 2014

(65) Prior Publication Data
US 2015/0326752 A1    Nov. 12, 2015

(30) Foreign Application Priority Data

Jun. 28, 2012    (JP) .................................. 2012-146104

(51) Int. Cl.
*H04N 1/60* (2006.01)
*G06T 5/00* (2006.01)
(Continued)

(52) U.S. Cl.
CPC ............. *H04N 1/6008* (2013.01); *G06T 5/008* (2013.01); *G06T 5/40* (2013.01); *H04N 1/4074* (2013.01); *H04N 1/6027* (2013.01); *H04N 1/6086* (2013.01); *G06T 2207/10024* (2013.01); *G06T 2207/20012* (2013.01); *G06T 2207/20021* (2013.01); *H04N 2201/0094* (2013.01); *H04N 2201/0096* (2013.01)

(58) Field of Classification Search
None
See application file for complete search history.

(56) References Cited

U.S. PATENT DOCUMENTS

2004/0234153 A1* 11/2004 Nakami .................. G06T 5/009
382/254
2007/0081721 A1* 4/2007 Xiao ....................... G06T 5/009
382/167

(Continued)

FOREIGN PATENT DOCUMENTS

| EP | 2 086 217 A1 | 8/2009 |
| JP | 2001-265084 A | 9/2001 |
| JP | 2005-122319 A | 5/2005 |

(Continued)

*Primary Examiner* — Thomas D Lee
(74) *Attorney, Agent, or Firm* — Birch, Stewart, Kolasch & Birch, LLP

(57) ABSTRACT

An image processing apparatus includes: a dividing process section (122) configured to divide a captured image into a plurality of partial images; a histogram creating section (123) configured to create a histogram representing a distribution of the number of pixels for density values with respect to each color component of each of the partial images; an adjustment value calculating section (124) configured to determine, for each of the partial images, an adjustment value based on a peak in the histogram; an adjusting section (127) configured to generate, for each of the partial images, tone correction data by replacing a specific input value in reference data with the adjustment value; and a correction process section (128) configured to generate a corrected image by tone-correcting each of the partial images with use of the tone correction data.

10 Claims, 27 Drawing Sheets

(51) Int. Cl.
*G06T 5/40* (2006.01)
*H04N 1/407* (2006.01)

(56) References Cited

U.S. PATENT DOCUMENTS

2010/0329559 A1  12/2010  Shindo et al.
2011/0222767 A1*  9/2011  Mitsunaga ............. H04N 9/045
                                                  382/169

FOREIGN PATENT DOCUMENTS

| JP | 2009-182599 A | 8/2009 |
| JP | 2011-205714 A | 10/2011 |
| JP | 2011-215925 A | 10/2011 |

* cited by examiner

FIG. 13

Region J

Region H   Region K

Histogram of region H

Histogram of region J

Histogram of region K

FIG. 19

| 1 | 2 | 1 |
|---|---|---|
| 2 | 8 | 2 |
| 1 | 2 | 1 |

FIG. 20

| 13 | 14 | 14 |
|---|---|---|
| 18 | 19-1 | 19-2 |
| 18 | 19-4 | 19-5 |

| MN | 0 |
|---|---|
| MN+△ | 1 |
| MN+△×2 | 2 |
| MN+△×3 | 3 |
| MN+△×4 | 4 |
| ⋮ | ⋮ |
| ⋮ | ⋮ |
| MN+△×255 | 255 |

△=(MX-MN)/255

IMAGE PROCESSING APPARATUS AND RECORDING MEDIUM FOR CORRECTING A CAPTURED IMAGE

TECHNICAL FIELD

The present invention relates to an image processing apparatus which carries out image processing on a captured image.

BACKGROUND ART

Along with progress of Internet technologies, there are increasing opportunities to save an image captured with the use of a mobile terminal apparatus such as a mobile phone. In addition, there are increasing opportunities to take not only images of landscapes, portraits, etc. but also images of explanatory diagrams and texts displayed in exhibitions etc. and images of slides used in academic conferences.

Patent Literature 1 discloses a technique of determining a contour of a target object on the basis of data of an image that is captured and stored in a storage section, cutting out an area inside the determined contour (which area does not include the contour itself) as an actual target part, and performing adjustment of luminance of the actual target part, adjustment of a color of the actual target part, correction of luminance unevenness of the actual target part, and whitening of a background.

CITATION LIST

Patent Literature 1

Japanese Patent Application Publication, Tokukai, No. 2005-122319 A (Publication Date: May 12, 2005)

SUMMARY OF INVENTION

Technical Problem

In Patent Literature 1, image data of the actual target part (area) is cut out, a color difference histogram is generated by obtaining, from the image, color differences and the number of pixels with each of the color differences, and a parameter for an image effect correction is obtained from the generated luminance color difference histogram, so as to perform color adjustment. Furthermore, a luminance histogram is generated by obtaining luminance values and the number of pixels with each of the luminance values and a color difference histogram is generated by obtaining color differences and the number of pixels with each of the color differences, and a parameter for an image effect correction is obtained from the luminance histogram and the color difference histogram so as to correct a background area color of the actual target part to white. Furthermore, an image of the actual target part is divided into a plurality of blocks, a luminance histogram is generated with respect to each block, and luminance unevenness of the image of the actual target part is corrected based on the generated luminance histogram with respect to each block. However, the method of Patent Literature 1 performs correction of a color and correction of luminance separately and so is troublesome. Furthermore, the method cannot correct color unevenness. Furthermore, in the method, failure in cutting out of image data of the actual target part greatly reduces exactness of the correction.

The present invention has been attained to solve the foregoing problems. An object of the present invention is to provide an image processing apparatus and a storage medium both of which are capable of correcting a captured image to have a desired image quality with a simple process without cutting out the image.

Solution to Problem

In order to solve the foregoing problem, an image processing apparatus in accordance with one aspect of the present invention includes: a reference data obtaining section configured to obtain predetermined reference data representing correspondences between a plurality of input values and their corresponding corrected values; a dividing process section configured to divide a captured image into a plurality of partial images; a histogram creating section configured to create a histogram representing a distribution of the number of pixels for density values with respect to each color component of each of the partial images; an adjustment value determining section configured to determine, for each of the partial images, an adjustment value based on a peak in the histogram; a tone correction data generating section configured to generate, for each of the partial images, tone correction data by replacing a specific input value of the input values of the reference data with the adjustment value; and a correction process section configured to generate a corrected image by tone-correcting each of the partial images with use of the tone correction data.

Advantageous Effects of Invention

One aspect of the present invention can realize an image processing apparatus capable of correcting a captured image to have a desired image quality with a simple process without cutting out an image.

BRIEF DESCRIPTION OF DRAWINGS

FIG. 13 is a view illustrating 5×5 images obtained by dividing output target image data.

Figure 18:
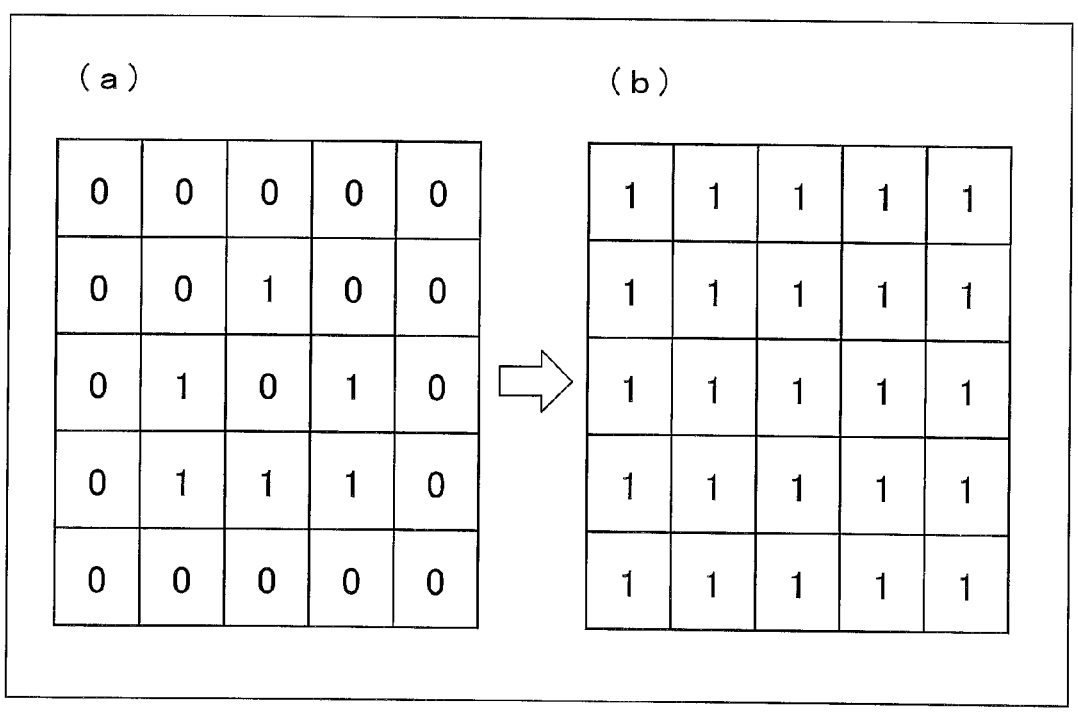

(a) of FIG. 18 illustrates a verification flag immediately after verification by a verification section. (b) of FIG. 18 illustrates a verification flag at a time when an adjustment value interpolating section determines a final adjustment value.

FIG. 19 is a view illustrating filter coefficients used in determining a final adjustment value.

FIG. 20 is an enlarged view of a part where a second partial image neighbors a first partial image.

Figure 21:
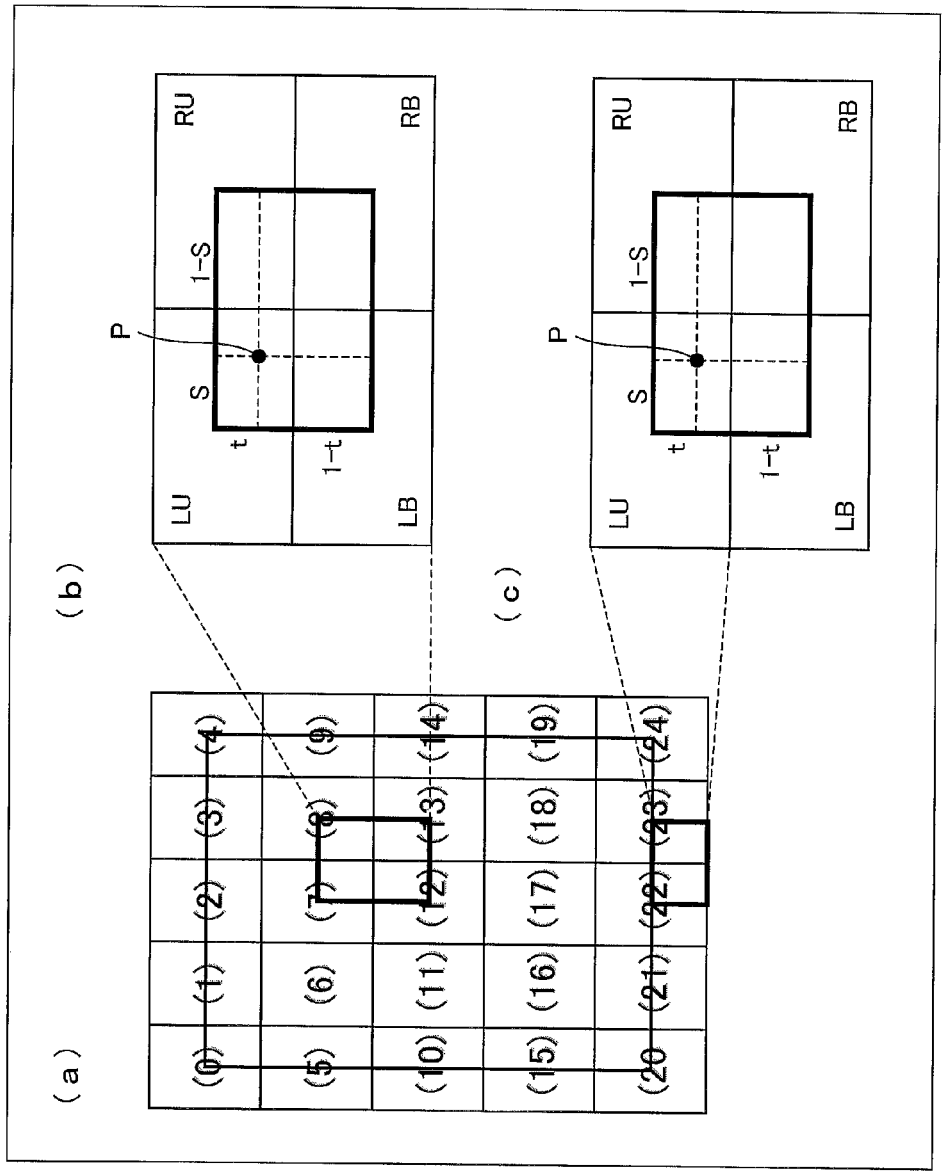

FIG. 21 is a view illustrating how to perform tone correction by interpolating calculation using tone correction data obtained for a plurality of partial images.

Figure 22:
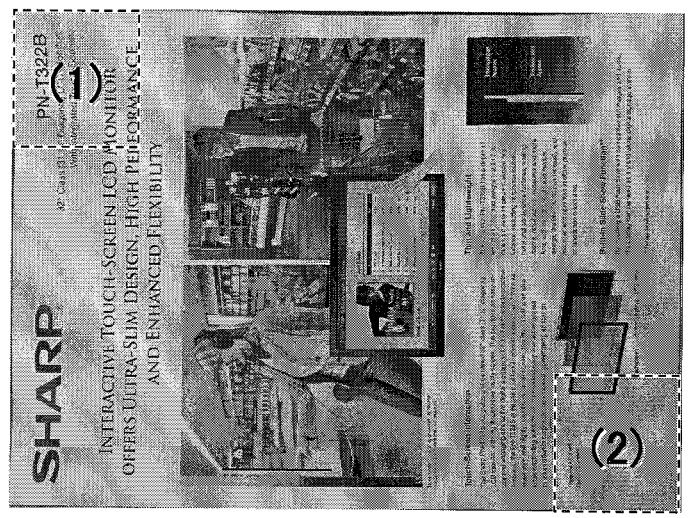

FIG. 22 is a view illustrating another example of an image represented by output target image data.

Figure 23:
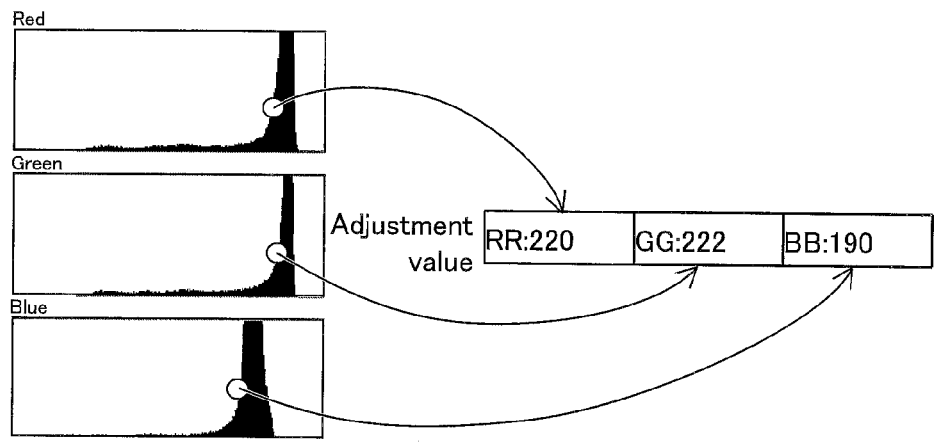

FIG. 23 is a view illustrating a histogram and an adjustment value for a partial image (1) in FIG. 22.

Figure 24:
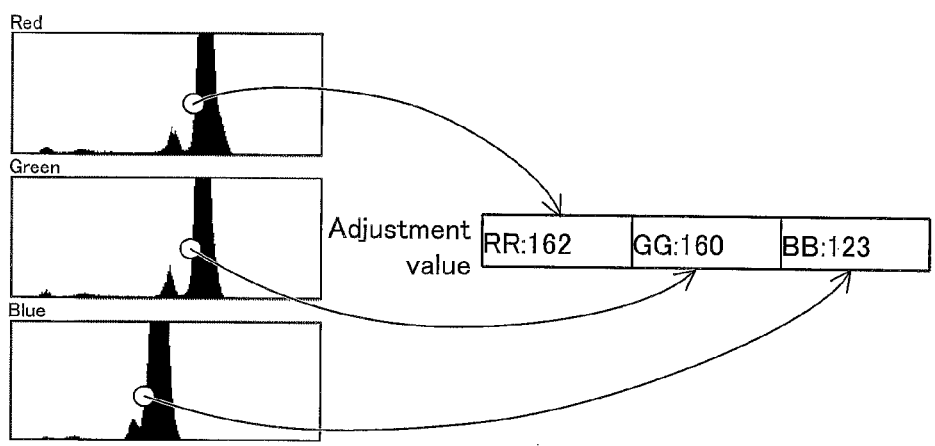

FIG. 24 is a view illustrating a histogram and an adjustment value for a partial image (2) in FIG. 22.

Figure 25:
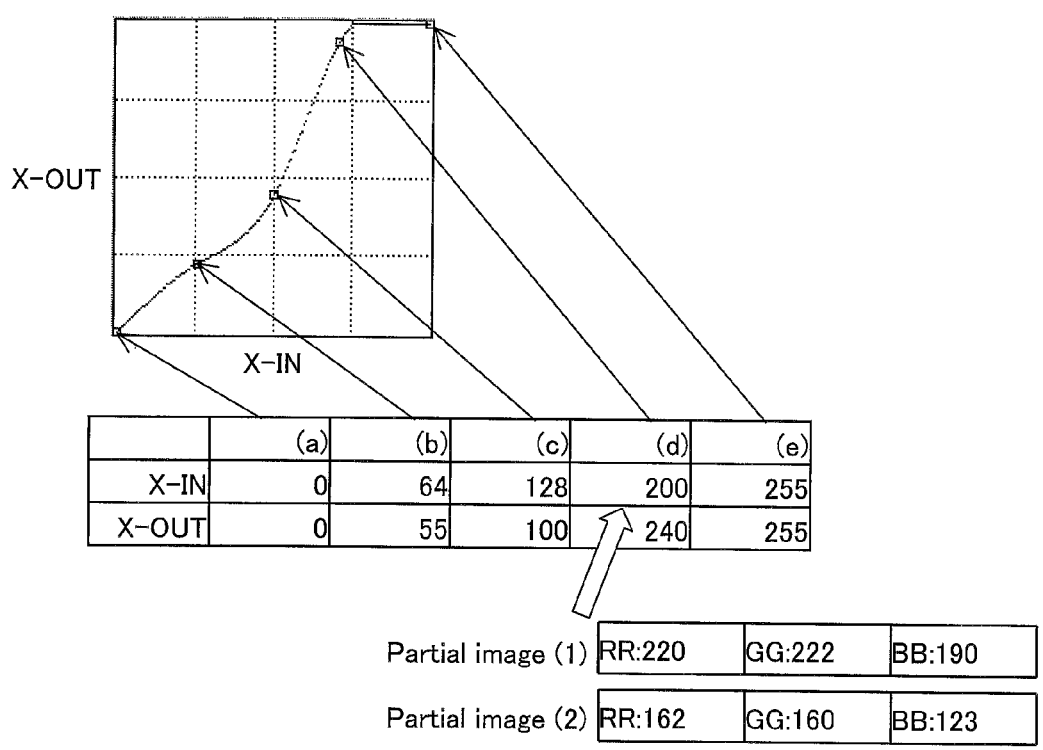

FIG. 25 is a view illustrating how a input value in referential correction data is replaced with an adjustment value.

Figure 26:
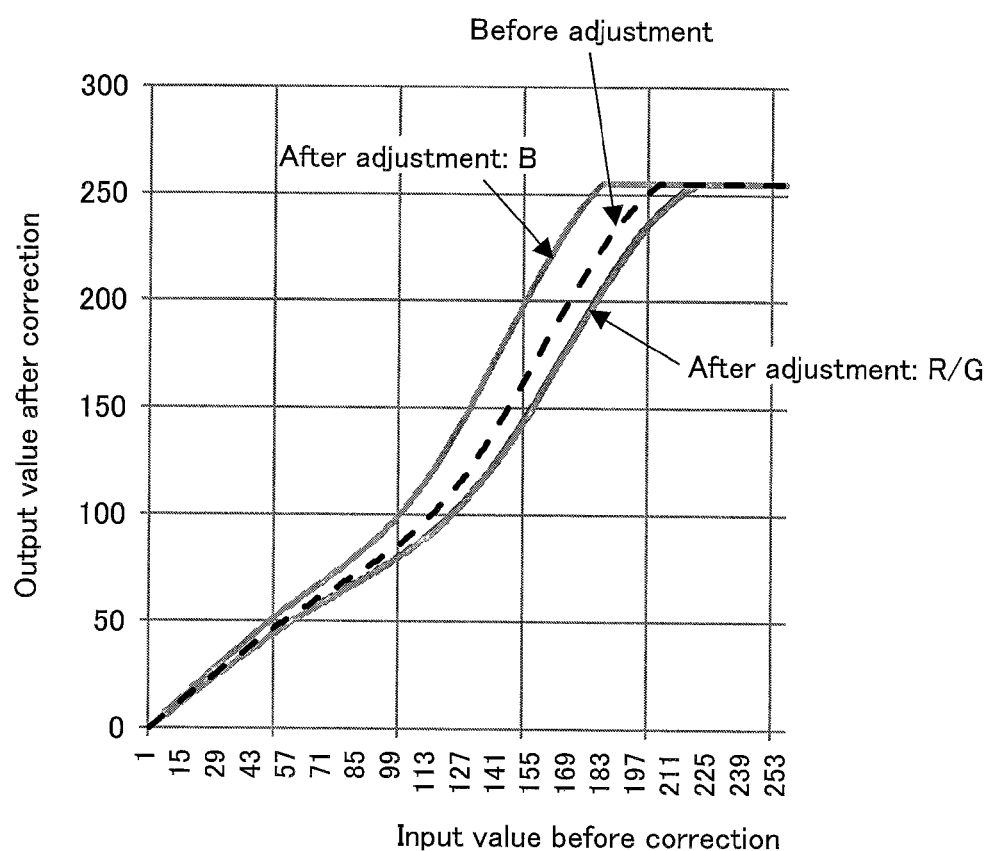

FIG. 26 is a view graphing tone correction data obtained with respect to the partial image (1).

Figure 27:
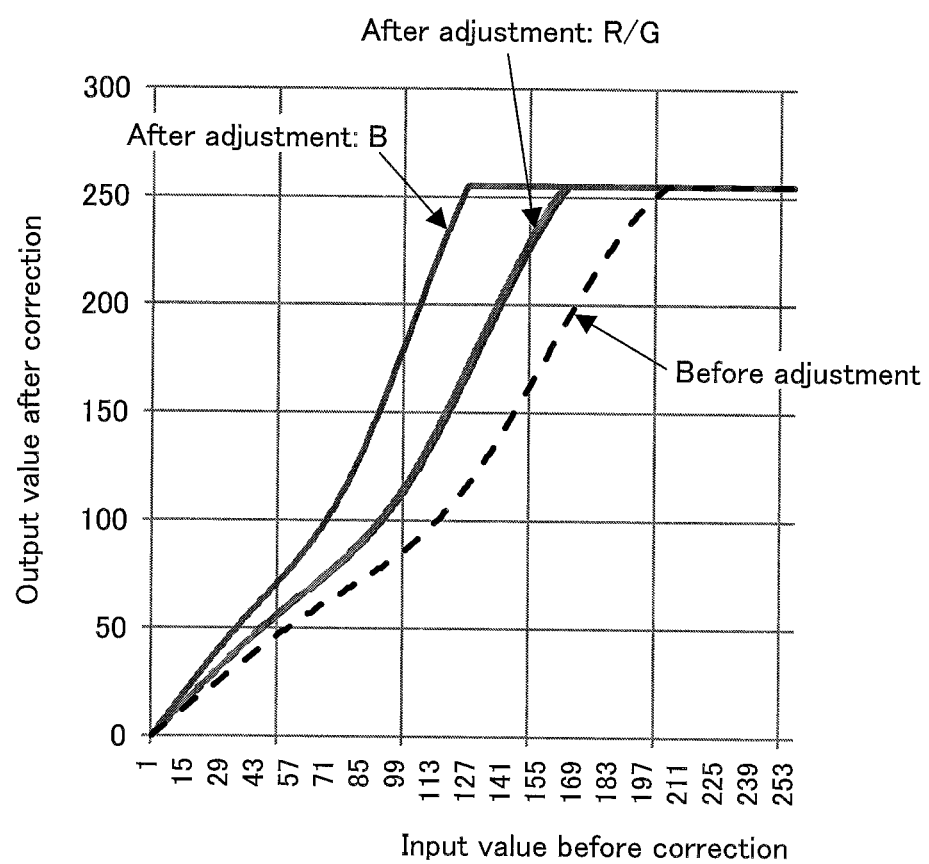

FIG. 27 is a view graphing tone correction data obtained with respect to the partial image (2).

Figure 28:
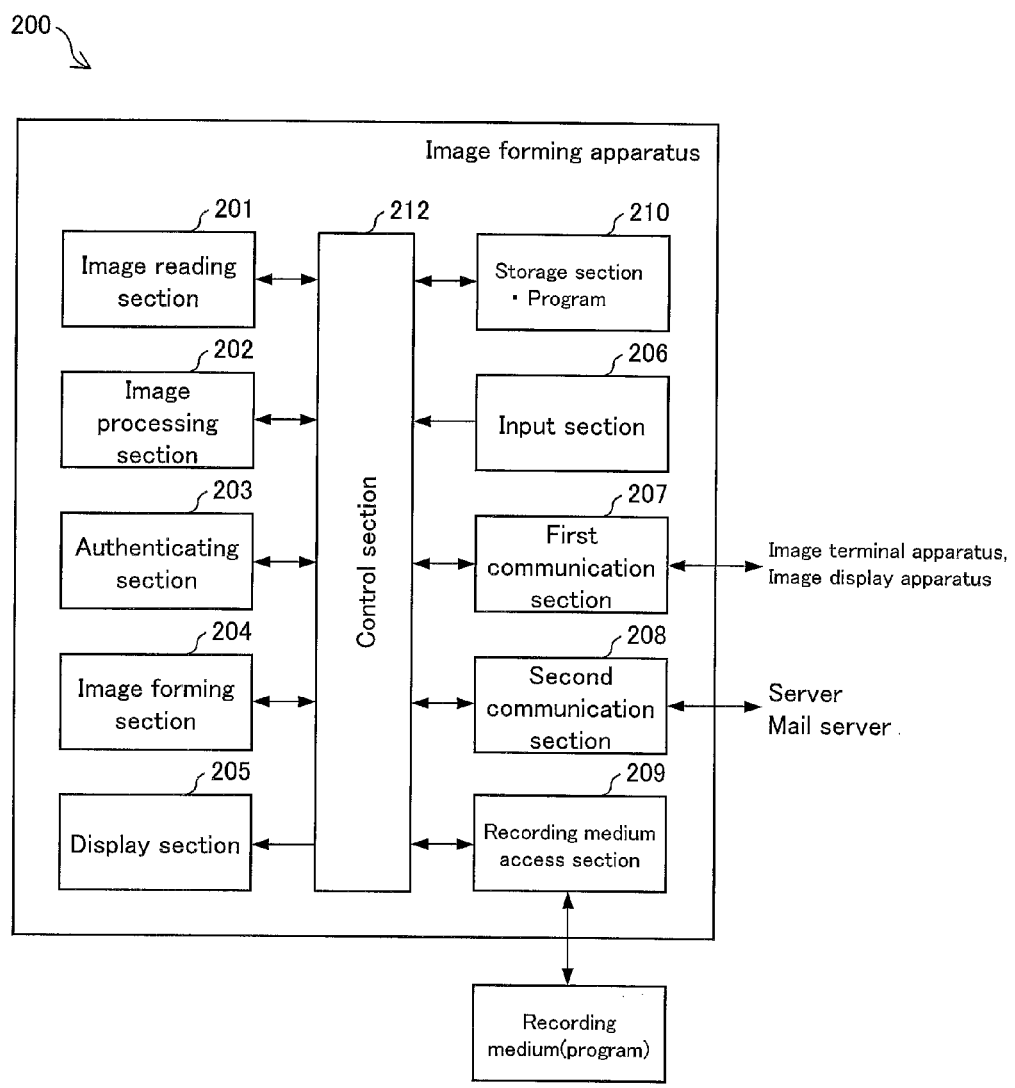

FIG. 28 is a block diagram illustrating a configuration of an image forming apparatus of the embodiment of the present invention.

Figures 29, 30:
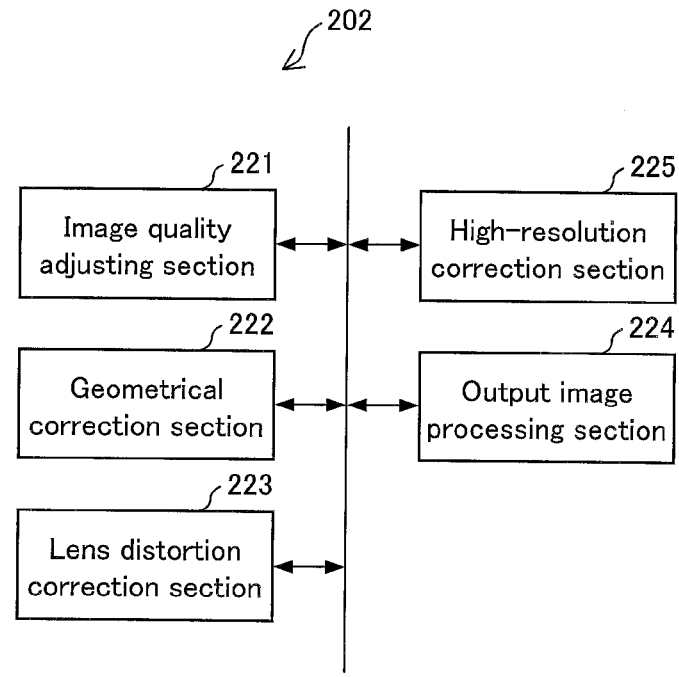

FIG. 29 is a block diagram illustrating an internal configuration of an image processing section of the image forming apparatus.

FIG. 30 illustrates an example of a look-up table created for adjustment of a color balance of the image.

Figure 31:
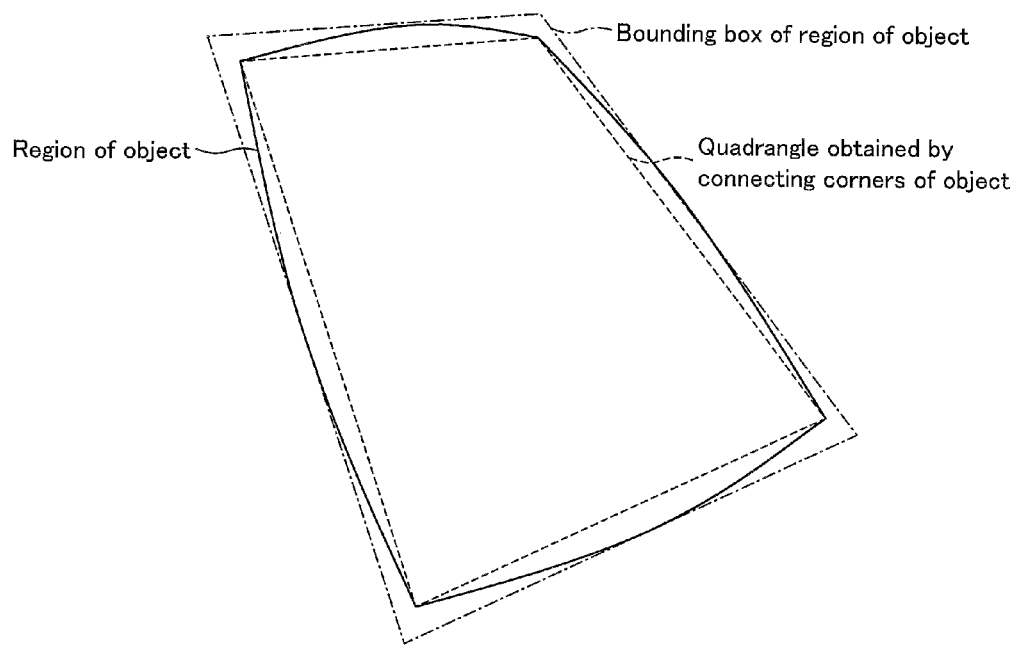

FIG. 31 illustrates an example of correction of lens distortion of the image.

Figure 32:
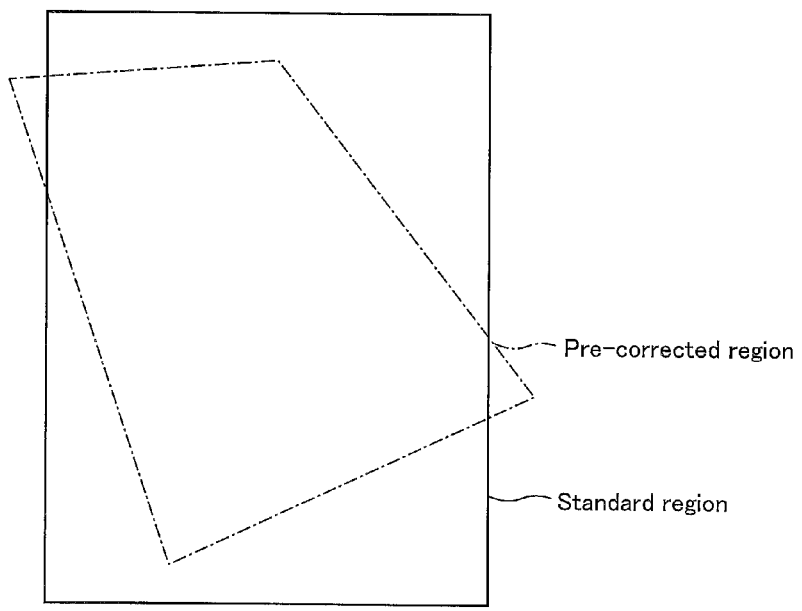

FIG. 32 illustrates an example of correction of geometrical distortion and skew of the image.

DESCRIPTION OF EMBODIMENTS

An embodiment of the present invention is described below in detail.

(1) Overall Configuration of Captured Image Processing System

Figure 1:
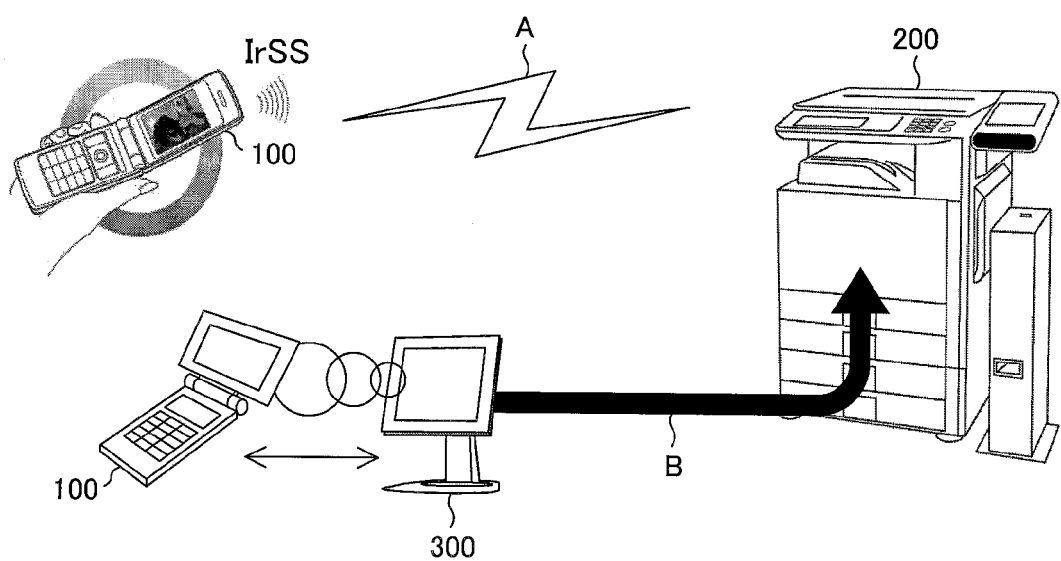
FIG. 1 illustrates an overall configuration of a captured image processing system of an embodiment of the present invention.

FIG. 1 illustrates an overall configuration of a captured image processing system of the present invention. As illustrated in FIG. 1, the captured image processing system includes a mobile terminal apparatus (image processing apparatus) 100, such as a camera-equipped mobile phone or a digital still camera, that includes an image-capturing section; an image forming apparatus (image output apparatus) 200 such as a multifunction printer or a printer; and an image display apparatus (image output apparatus) 300 such as an information display and an electronic whiteboard.

The mobile terminal apparatus 100 is carried around by a user. The user can capture an image of an object in various situations with the use of the mobile terminal apparatus 100.

In the present embodiment, the mobile terminal apparatus 100 has a function of a document capturing mode of capturing a rectangular object such as a sheet or a poster on which a document image is printed, a display screen on which a document image is displayed (e.g. a display screen or a screen on which an image is projected by a projector) and causing the captured image to be outputted from the image forming apparatus 200 or the image display apparatus 300. That is, the mobile terminal apparatus 100 transmits, to the image forming apparatus 200 or the image display apparatus 300, image data (hereinafter referred to as output target image data) that is obtained by the capturing in the document capturing mode and is to be outputted from the image forming apparatus 200 or the image display apparatus 300.

The image forming apparatus 200 outputs the received output target image data or an image represented by the output target image data. Here, the image forming apparatus 200 may carry out predetermined image processing on the output target image data before carrying out the output processing. The image display apparatus 300 carries out display processing for displaying the output target image data.

Examples of output processing executed by the image forming apparatus 200 encompass printing processing of printing/outputting an image represented by output target image data, filing processing of storing output target image data in a storage apparatus such as a server or a USB flash drive, and e-mail sending processing of sending an e-mail to which output target image data is attached. Output processing executed by the image display apparatus 300 is display processing of displaying the output target image data.

The mobile terminal apparatus 100 and the image forming apparatus 200 are capable of communicating with each other. As described above, the mobile terminal apparatus 100 transmits the output target image data to the image forming apparatus 200. As a method of communication between the mobile terminal apparatus 100 and the image forming apparatus 200, there are a method shown by the sign "A" and a method shown by the sign "B" in FIG. 1. The method shown by the sign "A" is a wireless communication method based on any one of infrared communication standards such as IrSimple. The method shown by the sign is contactless wireless communication such as Felica (registered trademark). Specifically, the method shown by the sign "B" is a method of once transmitting the output target image data to the image display apparatus 300 from the mobile terminal apparatus 100 and then transferring the data from the image display apparatus 300 to the image forming apparatus 200 with the use of wireless communication such as Bluetooth (registered trademark). In the present embodiment, it is assumed that a user operates the mobile terminal apparatus 100 in front of the image forming apparatus 200 and transmits data from the mobile terminal apparatus 100 to the image forming apparatus 200 with the use of a short-range wireless communication method such as infrared communication.

The image display apparatus 300 is, for example, an information display or an electronic whiteboard which is made up of a liquid crystal display, a plasma display, an organic electroluminescence display, or the like. The image display apparatus 300 carries out display processing of displaying an image represented by the output target image data. This display processing is one kind of output processing of outputting the output target image data. That is, it can be said that the image display apparatus 300 is an image output apparatus that carries out output processing of outputting the output target image data. It is also possible that after the image represented by the output target image data is displayed on the image display apparatus 300, the image is printed by the image forming apparatus 200, transmitted to another address by e-mail, or stored in a computer or a server or the like connected via a network.

Note that a method of communication among the mobile terminal apparatus 100, the image forming apparatus 200 and the image display apparatus 300 is not limited to those described above, and can be one utilizing a known communication method. For example, the output target image data may be transmitted to the image forming apparatus 200 or the image display apparatus 300 as an attachment to an e-mail.

(2) Configuration of Mobile Terminal Apparatus

Figure 2:
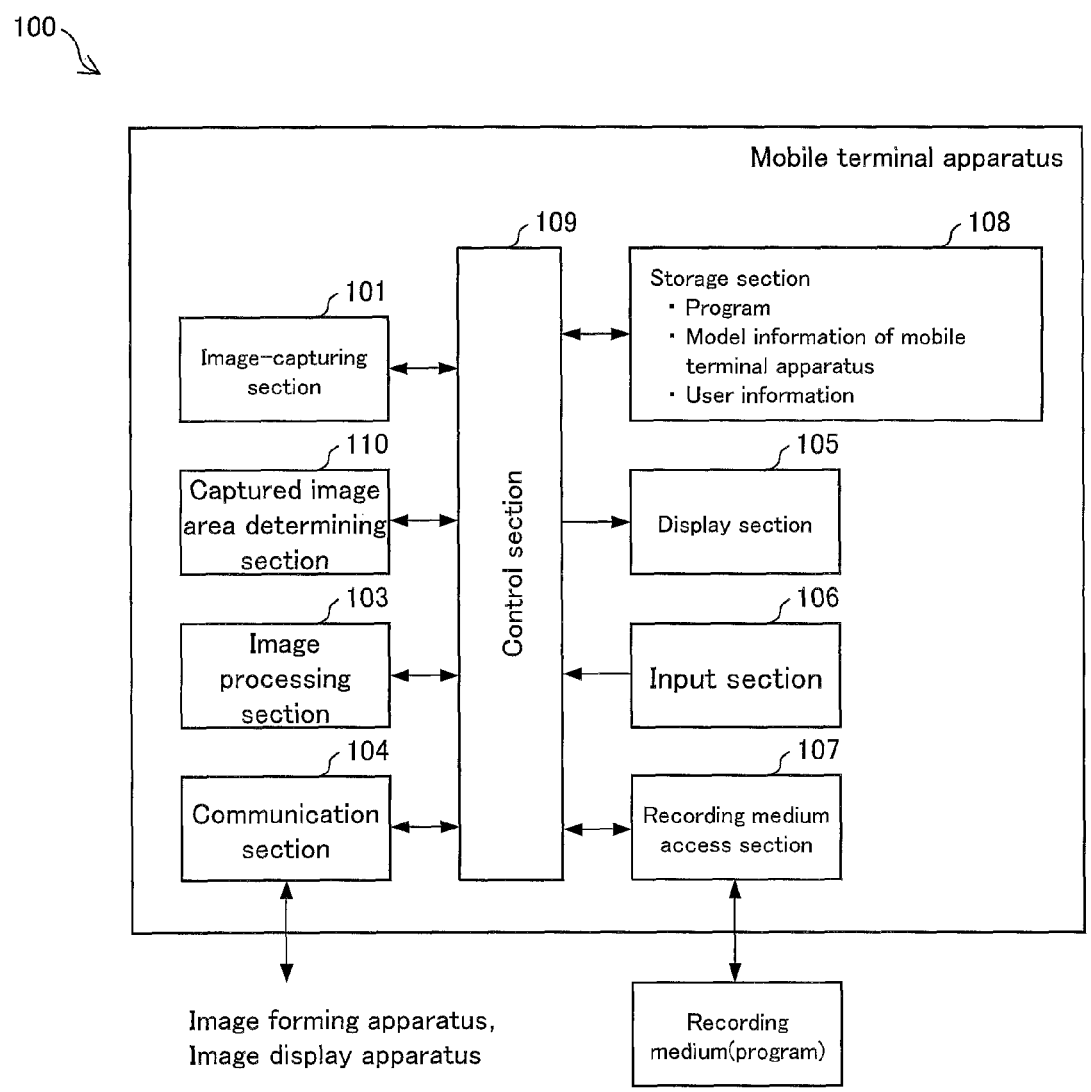
FIG. 2 is a block diagram illustrating a configuration of a mobile terminal apparatus of the embodiment of the present invention.

With reference to FIG. 2, the mobile terminal apparatus 100 of the present embodiment is described. FIG. 2 is a block diagram illustrating a configuration of the mobile terminal apparatus 100. As illustrated in FIG. 2, the mobile terminal apparatus 100 includes an image-capturing section 101, a captured image area determining section 110, an image processing section 103, a communication section 104, a display section 105, an input section 106, a storage medium access section 107, a storage section 108, and a control section 109.

The image-capturing section 101 captures an image of an object with the use of a CCD sensor or a CMOS sensor, and then causes the display section 105 to display a captured image obtained by capturing the object. Note that the image-capturing section 101 captures an image of an object at preset resolution. Note also that a range (hereinafter referred to as a captured image area) captured by the image-capturing section 101 is determined in accordance with a preset zooming ratio. It is assumed here that the captured image area is a rectangle that is Xmax in width and Ymax in height.

In a case where the document capturing mode is selected by a user, the captured image area determining section 110 determines, based on the captured image captured by the image-capturing section 101 and displayed on the display section 105, whether the rectangular captured object is within the captured image area. Further, the captured image area determining section 110 causes image data representing the captured image displayed on the display section 105 to be stored in the storage section 108 as output target image data at a designated timing. Details of the captured image area determining section 110 will be described later.

The image processing section 103 carries out image quality correction processing such as correction of luminance, correction of color and/or luminance unevenness, and correction of a background color to white on the output target image data stored in the storage section 108 so as to generate corrected image data, and causes the corrected image data to be stored in the storage section 108 in such a manner that the corrected image data is associated with the output target image data. Details of the image processing section 103 will be described later.

The communication section 104 has a serial transfer/parallel transfer function based on USB (Universal Serial Bus) 1.1 or USB 2.0 and a wireless data communication function. The communication section 104 transmits the corrected image data (or output target image data) to the image forming apparatus 200 or the image display apparatus 300 in accordance with a transmission instruction inputted by a user.

The display section 105 is, for example, constituted by a liquid crystal display. The input section 106 has a plurality of buttons and accepts data input etc. by a user.

The storage medium access section 107 reads out, from a storage medium, a program for carrying out each processing of the mobile terminal apparatus 100.

The storage section 108 stores therein the program for carrying out each processing of the mobile terminal apparatus 100, model information of the mobile terminal apparatus 100, user information, and data needed for execution of the processing. The user information is information for identifying a user of the mobile terminal apparatus 100. The user information is, for example, a user ID, a password, or the like. Moreover, the storage section 108 stores therein the output target image data obtained by capturing by the document capturing mode and related information (e.g. output processing information (described later), file name).

The control section 109 controls each section of the mobile terminal apparatus 100. Upon input of an instruction to select the document capturing mode to the input section 106, the control section 109 causes the display section 105 to display a screen prompting the user to input an instruction to select the type of output processing of the image forming apparatus 200 (e.g. printing processing, filing processing, e-mail sending processing) and a setting condition (e.g. a printing condition such as the number of printing, an address of a filing destination server, an e-mail destination address) for execution of the selected output processing. Then, the control section 109 obtains output processing information representing the type of output processing and the setting condition for the output processing.

The control section 109 appends a file name and the output processing information to the output target image data stored in the storage section 108.

Upon input of a transmission instruction to the input section 106, the control section 109 causes the communication section 104 to execute transmitting processing of transmitting the corrected image data (or output target image data) stored in the storage section 108 to the image forming apparatus 200 or the image display apparatus 300. Together with the corrected image data (or output target image data), the communication section 104 transmits, to the image forming apparatus 200 or the image display apparatus 300, the file name and output processing information and model information and the user information that are stored in the storage section 108.

Figure 3:
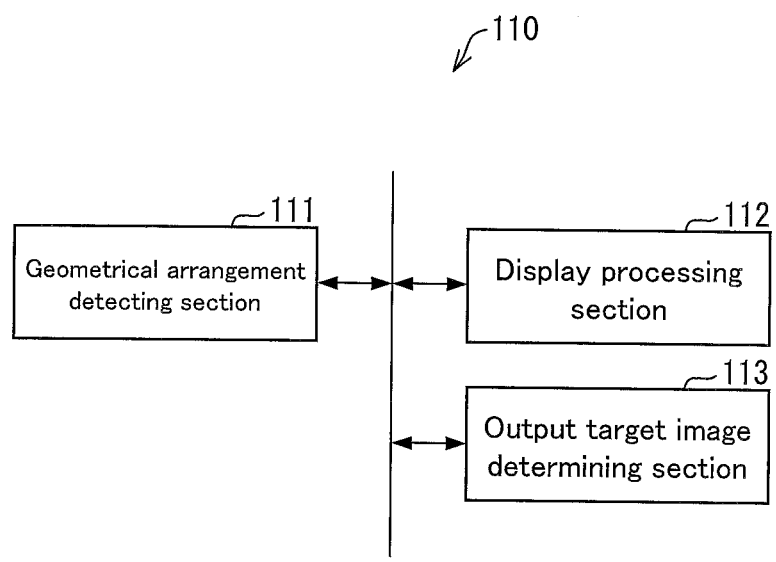
FIG. 3 is a block diagram illustrating a configuration of a captured image area determining section of the mobile terminal apparatus.

(3) Captured Image Area Determining Section (3-1) Configuration of Captured Image Area Determining Section Next, the following describes a detailed configuration of the captured image area determining section 110. FIG. 3 is a block diagram illustrating an internal configuration of the captured image area determining section 110. As illustrated in FIG. 3, the captured image area determining section 110 includes a geometrical arrangement detecting section 111, a display processing section 112, and an output target image determining section 113.

The geometrical arrangement detecting section 111 extracts groups of edge pixels that form a boundary between a captured object and a background assuming that the captured object has a rectangular shape, and thus detects geometrical arrangement (geometrical distortion) of the captured object.

The display processing section 112 determines, based on the geometrical arrangement of the captured object, whether the captured object is within the captured image area or not, and causes the display section 105 to display a result of the determination.

The output target image determining section 113 determines, as output target image data, image data representing the captured image displayed on the display section 105 at a designated timing, and causes the output target image data to be stored in the storage section 108.

(3-2) Processing of Captured Image Area Determining Section

Figure 4:
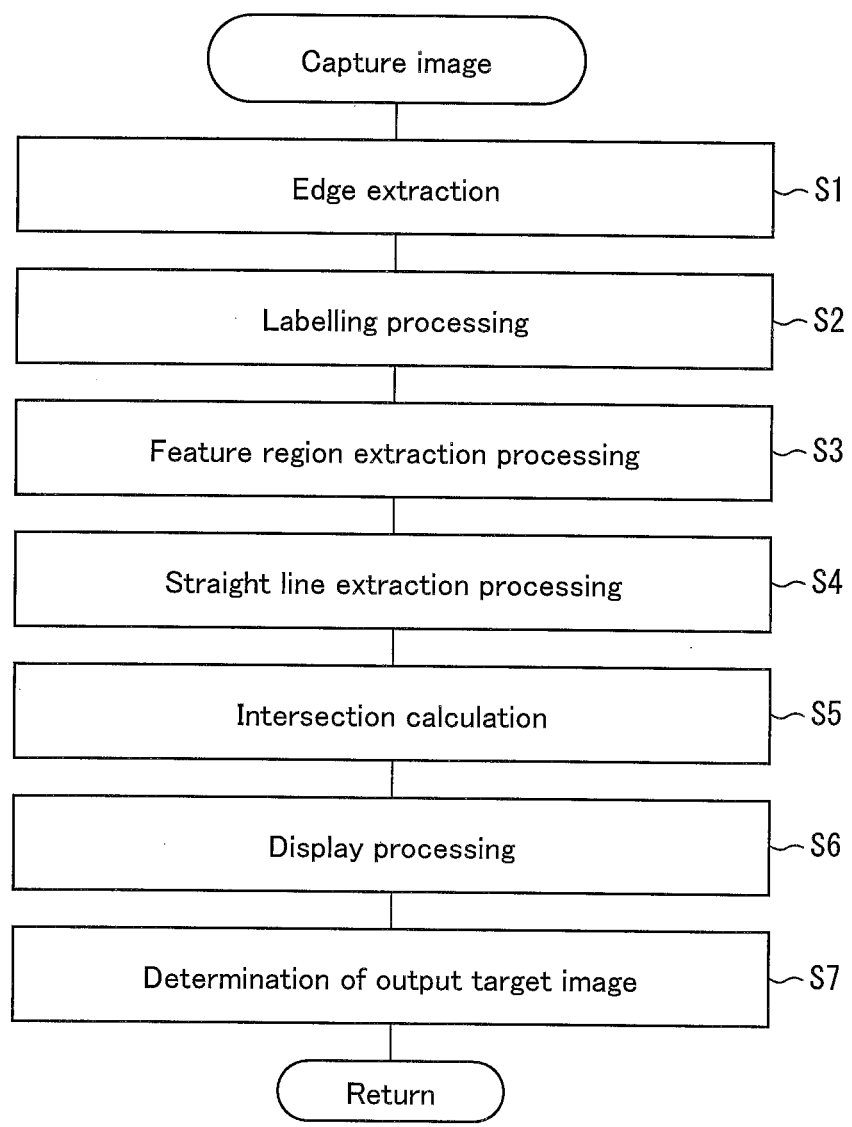
FIG. 4 is a flow chart illustrating an example of processes carried out by the captured image area determining section.

The following describes an example of specific processing of the captured image area determining section 110. FIG. 4 is a flow chart illustrating an example of the processing of the captured image area determining section 110.

(Step 1 (S1))

First, the geometrical arrangement detecting section 111 extracts edge pixels from a captured image that is captured by the image-capturing section 101 and is being displayed on the display section 105. The edge pixels are extracted, for example, by applying a Canny filter to a luminance image captured by the image-capturing section 101. The Canny filter is a filter for detecting a thinned edge with the use of a Gaussian filter and a Sobel filter.

(Step S2 (S2))

Next, the geometrical arrangement detecting section 111 carries out labelling processing of giving different labels to respective regions of connected edge pixels (connected edge regions).

Figure 5:
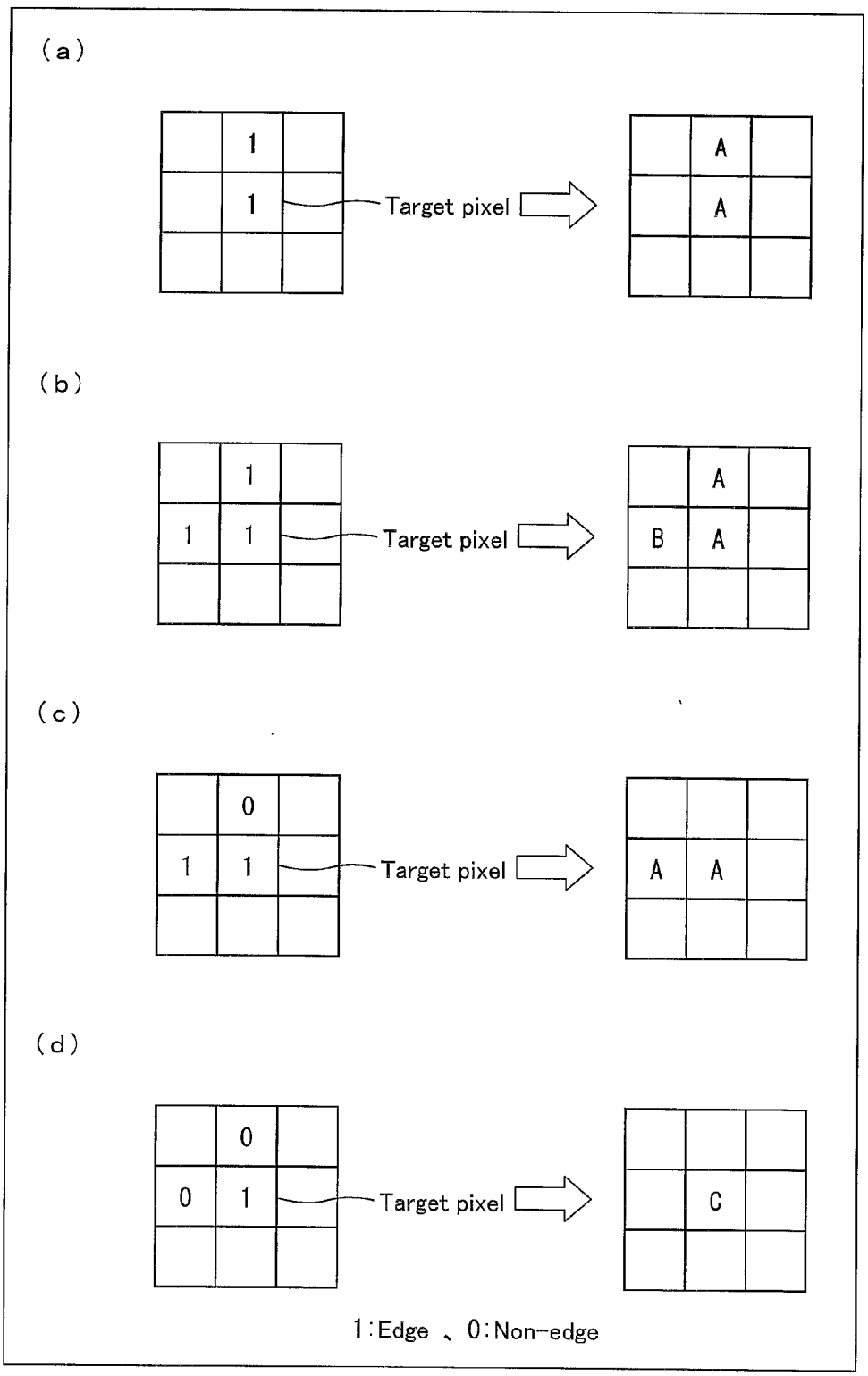
FIG. 5 illustrates a method of labelling of a connected edge region.

The geometrical arrangement detecting section 111 carries out the labelling by the following method as illustrated in FIG. 5:

(I) In a case where a target pixel is an edge pixel and where an upper adjacent pixel is an edge pixel that has been given a label, the target pixel is given the same label ((a) of FIG. 5).

(II) In a case where a left adjacent pixel is an edge pixel that has been given a label different from the upper adjacent pixel, the target pixel is given the same label as the label of the upper adjacent pixel ((b) of FIG. 5).

(III) In a case where the upper adjacent pixel is a non-edge pixel and the left adjacent pixel is an edge pixel, the target pixel is given the same label as the left adjacent pixel ((c) of FIG. 5).

(IV) In a case where both of the upper adjacent pixel and the left adjacent pixel are a non-edge pixel, the target pixel is given a new label ((d) of FIG. 5).

(V) All of the edge pixels are labelled.

(VI) In a case where there is a pixel given a plurality of labels, the pixel is given a single label in accordance with the above rule.

(Step 3 (S3))

Next, the geometrical arrangement detecting section 111 extracts, from the connected edge regions that have been labelled, a candidate of a region (hereinafter referred to as a feature region) including the boundary between the captured object and the background.

The captured object is generally captured in such a manner that it occupies a large part of the captured image area with its center close to the center of the captured image area. Accordingly, the boundary between the captured object and the background has its center in the vicinity of the center of the captured image area and is long in length in a lateral direction (width direction) and a longitudinal direction (height direction) of the captured image area. The geometrical arrangement detecting section 111 extracts, as a feature candidate, a connected edge region that meets the following condition A.

Condition A: Assume that an upper left corner of the captured image area is an origin, a rightward direction (width direction) is an x axis, a downward direction (height direction) is a y axis, an x coordinate of a right end of the captured image area is Xmax, and a y coordinate of a lower end of the captured image area is Ymax. In this case, a length of a connected edge region in the width direction is ¼ or larger than the width (i.e., Xmax) of the captured image area, a length of the connected edge region in the height direction is ¼ or larger than the height (i.e., Ymax) of the captured image area, an x coordinate of a center of the connected edge region is Xmax/4 or larger and 3×Xmax/4 or smaller, and a y coordinate of the center of the connected edge region is Ymax/4 or larger and 3×Ymax/4 or smaller.

(Step 4 (S4))

Next, the geometrical arrangement detecting section 111 carries out processing (straight line extraction processing) of extracting, from the feature region, groups of edge pixels arranged in a shape of a line segment which groups form upper, left, right, and lower sides of a rectangle which side is a boundary between the rectangular captured object and the background and specifying approximate straight lines to the extracted groups of edge pixels.

It is highly likely that the upper side is located in an upper half of the captured image and is parallel to the width direction of the captured image area. It is highly likely that the left side is located in a left half of the captured image and is parallel to the height direction of the captured image area. It is highly likely that the right side is located in a right half of the captured image and is parallel to the height direction of the captured image area. It is highly likely that the lower side is located in a lower half of the captured image and is parallel to the width direction of the captured image area.

In view of this, in each of such areas (search areas) where the upper, left, right, and lower sides are highly likely to be located, a group of edge pixels which includes the largest number of edge pixels arranged in a specific direction in a shape of a line segment having a predetermined length or longer is extracted from the feature region image data as the group of edge pixels arranged in a shape of a line segment that forms a boundary between the rectangular captured object and the background. Then, approximate straight lines to the extracted groups of edge pixels are specified.

The search area for the upper side is an area whose y-coordinate ranges from 0 to Ymax/2. The search area for the left side is an area whose x-coordinate ranges from 0 to Xmax/2. The search area for the right side is an area whose x-coordinate ranges from Xmax/2 to Xmax. The search area for the lower side is an area whose y-coordinate ranges from Ymax/2 to Ymax. In cases of the upper and lower sides, the specific direction is a direction forming an angle of 45° or less with respect to a width direction of the captured image area. In cases of the left and right sides, the specific direction is a direction forming an angle of 45° or less with respect to a height direction of the captured image area.

In this way, the geometrical arrangement detecting section 111 generates equations for an upper side straight line, a left side straight line, a right side straight line, and a lower side straight line assuming that an approximate straight line to the group of edge pixels that has been extracted as the upper side is the upper side straight line, an approximate straight line to the group of edge pixels that has been extracted as the left side is the left side straight line, an approximate straight line to the group of edge pixels that has been extracted as the right side is the right side straight line, and an approximate straight line to the group of edge pixels that has been extracted as the lower side is the lower side straight line.

(Step 5 (S5))

Next, the geometrical arrangement detecting section 111 obtains coordinates of intersections on the basis of the equations obtained in S4. Specifically, the geometrical arrangement detecting section 111 obtains a coordinate of an intersection of the left side straight line and the upper side straight line, a coordinate of an intersection of the upper side straight line and the right side straight line, a coordinate of an intersection of the right side straight line and the lower side straight line, and a coordinate of an intersection of the lower side straight line and the left side straight line as a coordinate of an upper left vertex, a coordinate of an upper right vertex, a coordinate of a lower right vertex, and a coordinate of a lower left vertex, respectively. Then, the geometrical arrangement detecting section 111 supplies extraction result information including the coordinates of these four vertexes to the display processing section 112.

Figure 6:
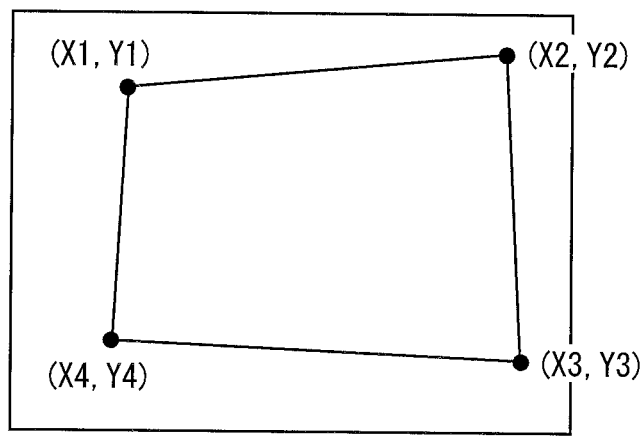
FIG. 6 illustrates an example of how intersections of approximate straight lines to the groups of edge pixels are calculated.

FIG. 6 illustrates an example of how the coordinates of the four vertexes are obtained. In FIG. 6, a coordinate of an upper left vertex (X1, Y1), a coordinate of an upper right vertex (X2, Y2), a coordinate of a lower right vertex (X3, Y3), and a coordinate of a lower left vertex (X4, Y4) are obtained.

In a case where equations for straight lines corresponding to only three sides could be obtained in S4, the geometrical arrangement detecting section 111 obtains an equation for a straight line corresponding to a remaining one side assuming that the straight line is a line passing along an end of the captured image area. Specifically, $x=0$ is used as an equation for the straight line corresponding to the remaining one side in a case where the left side has failed to be extracted, $x=X_{max}$ is used as an equation for the straight line corresponding to the remaining one side in a case where the right side has failed to be extracted, $y=0$ is used as an equation for the straight line corresponding to the remaining one side in a case where the upper side has failed to be extracted, and $y=Y_{max}$ is used as an equation for the straight line corresponding to the remaining one side in a case where the lower side has failed to be extracted. Then, the geometrical arrangement detecting section 111 obtains coordinates of four vertexes with the use of the equation for the straight line.

Note, however, that intersections with the straight line passing along the end of the captured image area are obtained as provisional vertex coordinates. For example, in a case where the right side has failed to be extracted, the coordinate of the upper right vertex and the coordinate of the lower right vertex are obtained as provisional vertex coordinates.

Then, the geometrical arrangement detecting section 111 generates extraction result information including (i) the coordinates of the four vertexes, (ii) information indicating that extraction of only three sides has succeeded, and (iii) extraction incapability information indicating a side having failed to be extracted, and then supplies the extraction result information to the display processing section 112. Note that the provisional vertex coordinates are accompanied by information indicating that they are provisional vertex coordinates.

In a case where equations for straight lines corresponding to three or four sides could not be obtained in S4, the geometrical arrangement detecting section 111 generates extraction result information indicating that a boundary between a captured object and a background could not be properly extracted, and supplies the extraction result information to the display processing section 112.

(Step 6 (S6))

Subsequently, the display processing section 112 causes a rectangular line connecting the coordinates of the four vertexes represented by the extraction result information to be displayed as a contour line of the captured object on the captured image.

In a case where the extraction result information includes the coordinates of the four vertexes and includes no extraction incapability information, the display processing section 112 determines whether or not the coordinates of the four vertexes are within the captured image area. In a case where all of the coordinates of the four vertexes are within the captured image area, the display processing section 112 causes the display section 105 to display information (e.g. "OK") indicating that the captured object is within the captured image area. Together with this information, the display processing section 112 causes the display section 105 to display a shutter button for determining an output target image.

Figure 7:
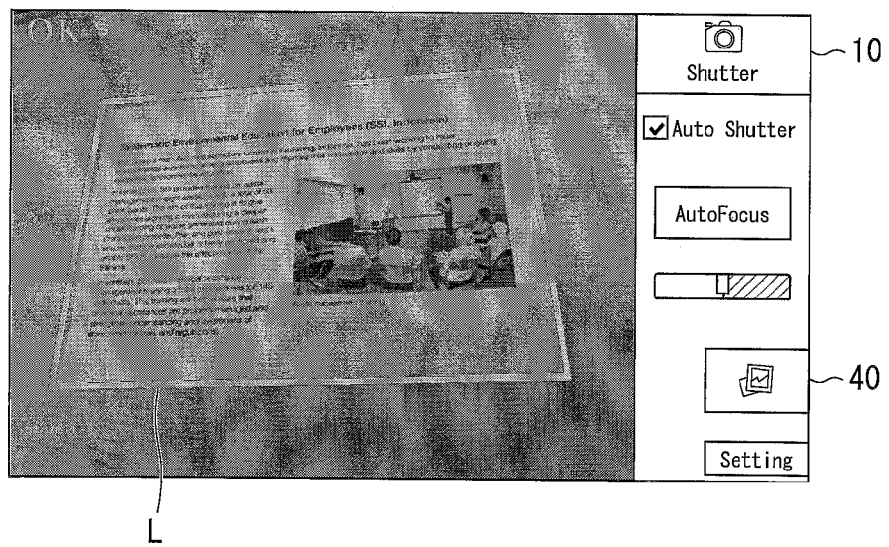
FIG. 7 illustrates an example of a screen on which information indicating that the captured object is within the captured image area is displayed.

FIG. 7 illustrates an example of a screen displayed in a case where all of the coordinates of the four vertexes are within the captured image area. In FIG. 7, a reference sign L indicates a contour line which is a quadrangular line connecting coordinates of vertexes. A reference sign 10 indicates a shutter button, and a reference sign 40 indicates an image reading button. The shutter button 10 is a button for determining, as an output target image, the captured image displayed on the display section 105. The image reading button 40 is a button for processing, as a captured image, an image stored in advance. When the image reading button 40 is pressed, a list of stored images is displayed. When a user selects one of the stored images, the selected image is subjected to a next process (process carried out after the shutter is pressed) as an image captured by the image-capturing section 101.

In a case where coordinates of three vertexes are within the captured image area and coordinates of one vertex are outside the captured image area, the display processing section 112 causes the display section 105 to display first missing information indicating that part (one corner) of the captured object cannot be captured.

Figure 8:
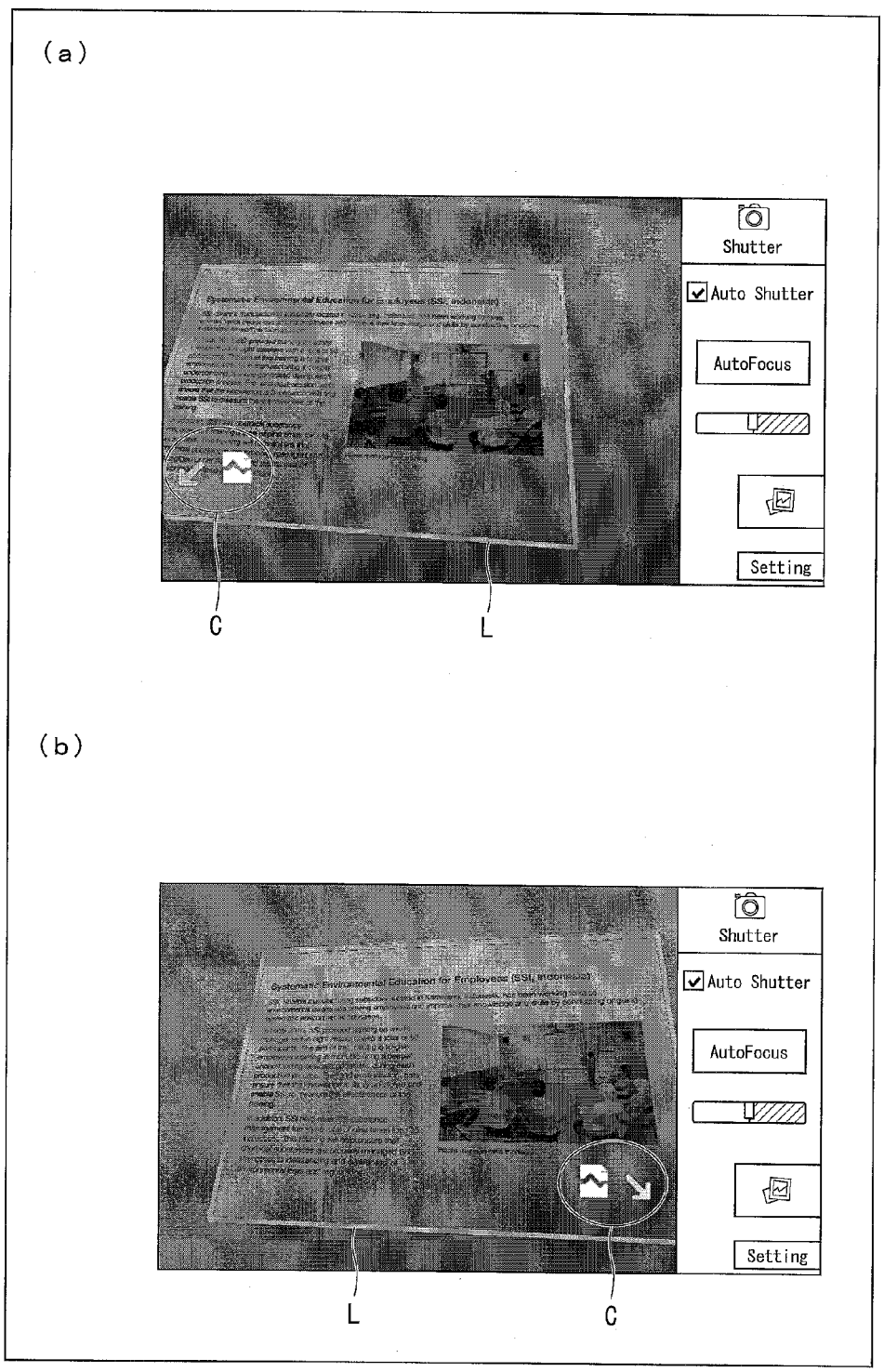
FIG. 8 illustrates an example of a screen on which first missing information is displayed.

(a) and (b) of FIG. 8 each illustrate an example of a screen displayed in the case where coordinates of one vertex are outside the captured image area. As illustrated in (a) and (b) of FIG. 8, as the first missing information, a first icon C indicating that a corner is missing is displayed in the vicinity of a coordinate of a vertex located outside the captured image area. This allows a user to easily recognize that a corner in the vicinity of the first icon C is outside the captured image area.

In a case where the extraction result information includes coordinates of four vertexes and extraction incapability information, the display processing section 112 determines whether the coordinates of the four vertexes are within the captured image area. When all of the coordinates of the four vertexes are within the captured image area, the display processing section 112 causes the display section 105 to display second missing information indicating that a part (one side) of the captured object cannot be captured.

Figure 9:
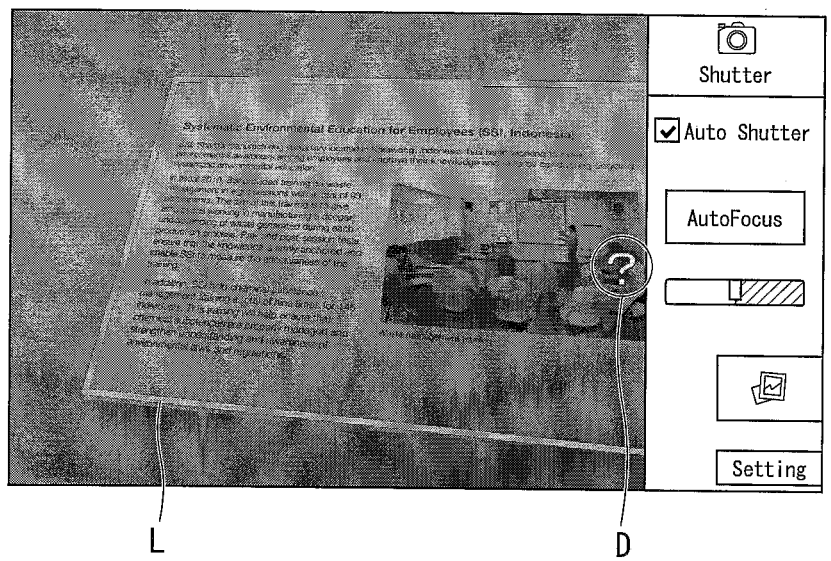
FIG. 9 illustrates an example of a screen on which second missing information is displayed.

FIG. 9 illustrates an example of a screen including the second missing information. As illustrated in FIG. 9, as the second missing information, a second icon D indicating that one side of an outline of the captured object is missing is displayed in the vicinity of the side located outside the captured image area. This allows a user to easily recognize that the side in the vicinity of the second icon D is outside the captured image area.

In a case other than the aforementioned cases, the display processing section 112 may cause the display section 105 to maintain the screen, or may cause the display section 105 to display information for urging a user to change the orientation of the image-capturing section 101 (e.g. "Adjust the orientation of the camera so that a captured object is within captured image area").

(Step 7 (S7))

Finally, the output target image determining section 113 determines output target image data, which is image data to be subjected to output processing. Specifically, the output target image determining section 113 detects a timing at which the shutter button 10 was operated in a state in which the information (e.g. "OK") indicating that the captured object is within the captured image area and the shutter button 10 are displayed on the display section 105, as illustrated in FIG. 7. The output target image determining section 113 determines, as a designated timing, the timing at which the shutter button 10 was operated, and determines, as the output target image data, image data representing a captured image displayed on the display section 105 at the designated timing.

Note that the output target image determining section 113 is configured to be capable of accepting an operation of the shutter button 10 only when information indicating that the captured object is within the captured image area is displayed.

(4) Process of Image Processing Section

Next, a description will be provided below as to the image processing section 103 in detail. In a case where one piece of output target image data stored in the storage section 108 is selected by a press of the image reading button 40 illustrated in FIG. 7, the image processing section 103 performs image processing on the selected output target image data.

Figure 10:
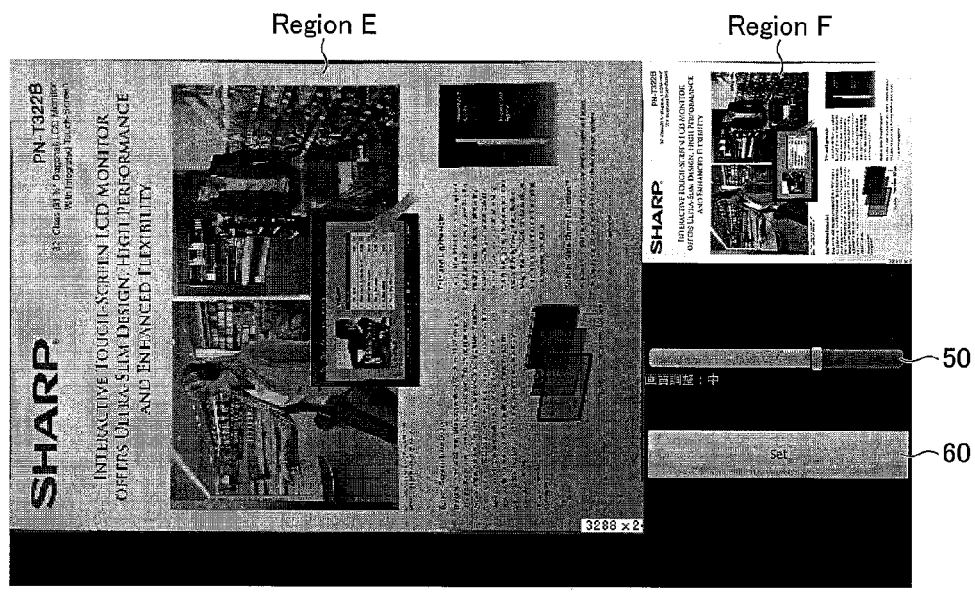
FIG. 10 is a view illustrating an example of a screen displayed when an image reading button in FIG. 7 is pressed.

FIG. 10 illustrates an example of a screen displayed on the display section 105 when the image reading button 40 illustrated in FIG. 7 is pressed. As illustrated in FIG. 10, the screen includes (i) a region E where an image represented by output target image data before correction is displayed, (ii) an image quality adjustment level bar 50 for setting an image quality adjustment level, and (iii) a region F where an image subjected to the image processing by the image processing section 103 is displayed.

In the present embodiment, the image processing section 103 accepts, as an image quality adjustment level, one of four scales including "Not applied", "Weak", "Middle", and "Strong" in accordance with an operation on the image quality adjustment level bar 50.

Furthermore, as illustrated in FIG. 10, a registration button 60 is displayed on the display section 105. When the registration button 60 is pressed, an image quality adjustment level being set at a timing when the registration button 60 is pressed is stored in the storage section 108.

Figure 11:
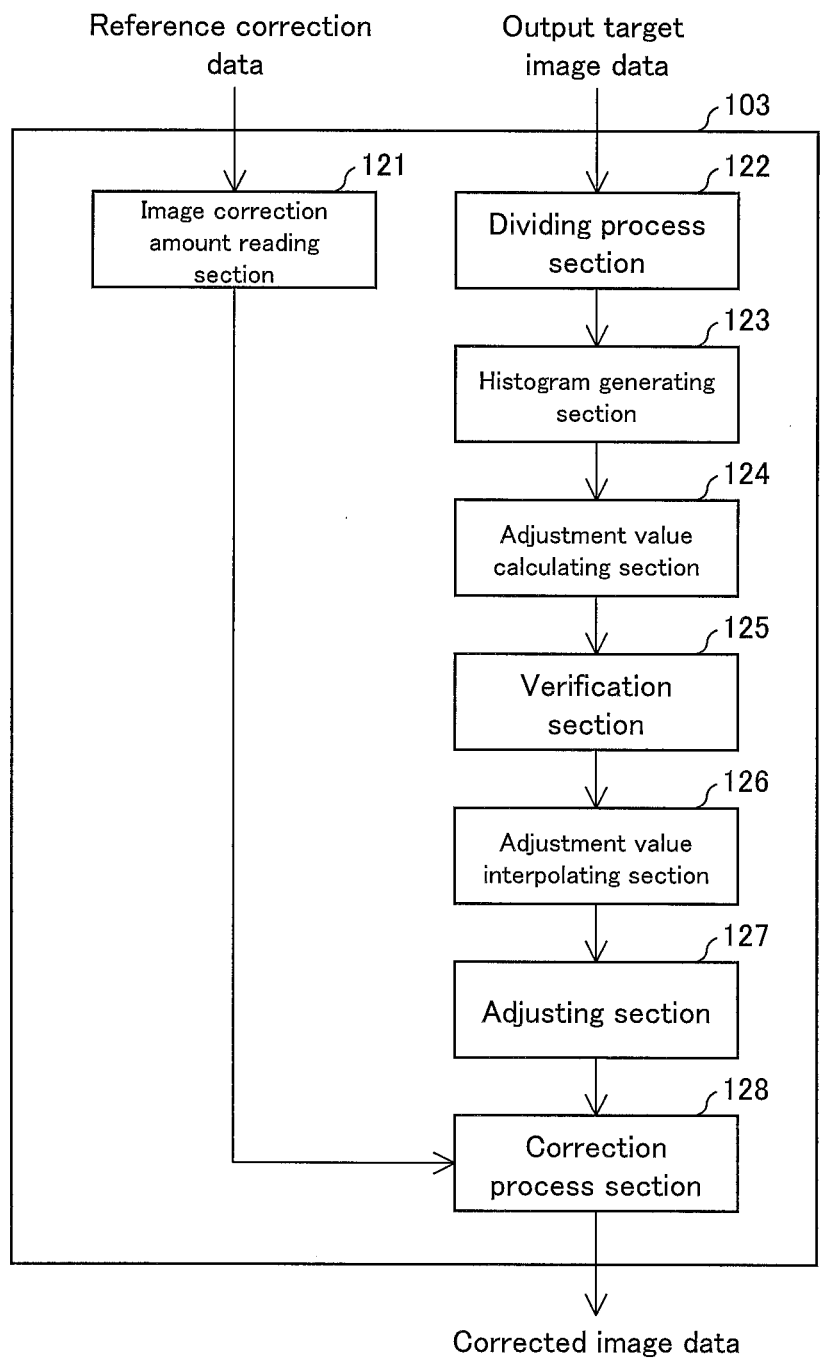
FIG. 11 is a block diagram illustrating a configuration of an image processing section of the mobile terminal apparatus.

FIG. 11 is a block diagram illustrating an internal configuration of the image processing section 103. As illustrated in FIG. 11, the image processing section 103 includes an image correction amount reading section (reference data obtaining section) 121, a dividing process section 122, a histogram creating section 123, an adjustment value calculating section (adjustment value determining section) 124, a verification section 125, an adjustment value interpolating section (adjustment value changing section) 126, an adjusting section (tone correction data generating section) 127, and a correction process section 128.

(4-1) Image Correction Amount Reading Section

With respect to each of color channels (e.g. R signal, G signal, and B signal of RGB signals) constituting image data obtained as a result of image-capturing by the image-capturing section 101, the image correction amount reading section 121 reads, from the storage section 108, reference correction data serving as a reference for tone correction.

The reference correction data is stored in the storage section 108 in advance. The reference correction data is obtained in advance from a reference tone correction curve used when an image captured by the image-capturing section 101 is outputted (displayed or printed) by the image display apparatus 300 or the image forming apparatus 200. The reference tone correction curve is a curve establishing a correspondence between an input value on a lateral axis and an output value on a longitudinal axis.

Firstly, image data is prepared representing a gray chart captured by the image-capturing section 101 in a standard illumination condition (a standard light source is used and a radiation angle of the light source toward a direction in which an image is captured, evenness of illumination, evenness of the light source etc. are set to meet predetermined conditions). Density values (pixel values) of color channels of the image data are subjected to tone correction with use of tone correction curves corresponding to the respective color channels, so that output characteristics of the image forming apparatus 200 and display characteristics of the image display apparatus 300 are checked. In this process, the tone correction curves corresponding to the respective color channels are adjusted so that the output characteristics of the image forming apparatus 200 and the display characteristics of the image display apparatus 300 realize the same appearances as those of the gray chart which is an original. The tone correction curves obtained as above for the respective color channels are regarded as reference tone correction curves. The reference tone correction curves can be considered as tone correction data for a one-dimensional lookup table in which input values and output values are in a one-to-one correspondence with each other.

A plurality of feature points are extracted from the reference tone correction curve in advance. When spline interpolation, linear interpolation etc. is carried out using certain points on the reference tone correction curve so as to generate pieces of data other than the certain points so that the number of the pieces of data is equal to the number of tones, and the pieces of data match the reference tone correction curve with high degree of coincidence, the certain points are extracted as feature points. In the present embodiment, five feature points (a) to (e) are extracted from the reference tone correction curve.

Figure 12:
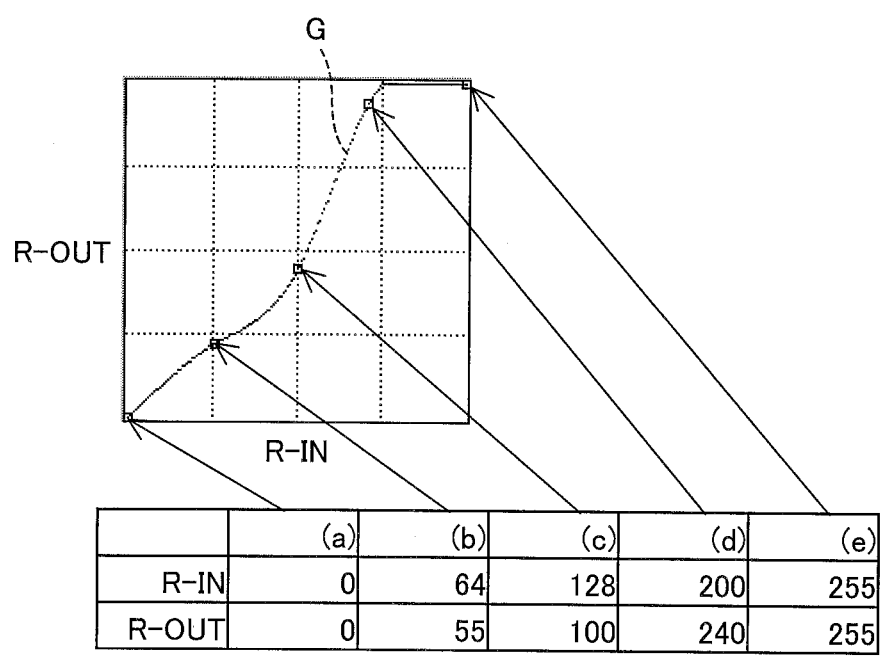
FIG. 12 is a view illustrating a referential tone correction curve and five feature points (a) to (e) extracted from the referential tone correction curve.

FIG. 12 illustrates a reference tone correction curve G for an R color channel and five feature points (a) to (e) extracted from the reference tone correction curve G. Data representing a correspondence between an input value and an output value at each of the feature points (a) to (e) is stored as reference correction data in the storage section 108 in advance.

The feature point (a) is a point at which the input value takes a minimum value "0". The feature point (b) is a point at which the output value takes a first predetermined value (55 in FIG. 12). The feature point (c) is a point at which the output value takes a second predetermined value (100 in FIG. 12). The feature point (d) is a point at which the output value takes a third predetermined value (240 in FIG. 12). The feature point (e) is a point at which the input value takes a maximum value "255".

The first predetermined value, the second predetermined value, and the third predetermined value are values experimentally set based on a plurality of sample images obtained by capturing various kinds of captured targets as samples. The first predetermined value and the second predetermined value are experimentally set based on density values in a range of making a text legible. For example, an upper limit value of that range (value above which a text is hard to be legible) is set as the second predetermined value, and any value smaller than the second predetermined value is set as the first predetermined value.

As the third predetermined value, there is experimentally set a density value at which an output of a captured image of a document sheet with a white background by an image forming apparatus or an image display apparatus is likely to be recognized as a white background.

(4-2) Dividing Process Section

Figure 13:
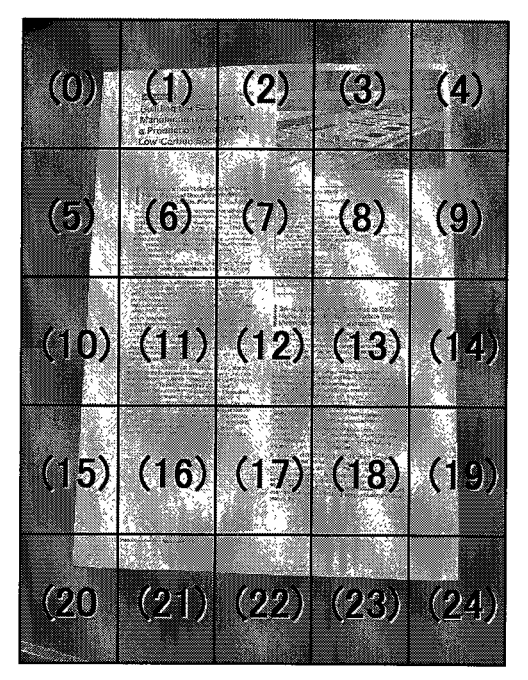

The dividing process section 122 carries out a process of dividing output target image data into a plurality of partial images. Various methods are possible as a method for the dividing process section 122 to divide the output target image data. A most simple example of the methods is a division of the output target image data into an M×N (M and N are natural numbers, at least one of which is 2 or more) first partial images. FIG. 13 is a schematic view illustrating a case where an image represented by the output target image data is divided into M×N partial images where M and N are each 5. Individual images indicated by (0) to (24) in FIG. 13 are the first partial images.

In the example of the division in FIG. 13, there is a case where the first partial image includes a captured target and a region (such as a background) other than the captured target (e.g. the first partial image (19) in FIG. 13). Accordingly, the dividing process section 122 may determine whether the first partial image includes different kinds of image regions, and carry out a subdividing process of subdividing the first partial image including different kinds of image regions into P×Q (P and Q are natural numbers, at least one of which is 2 or more) second partial images.

Figure 14:
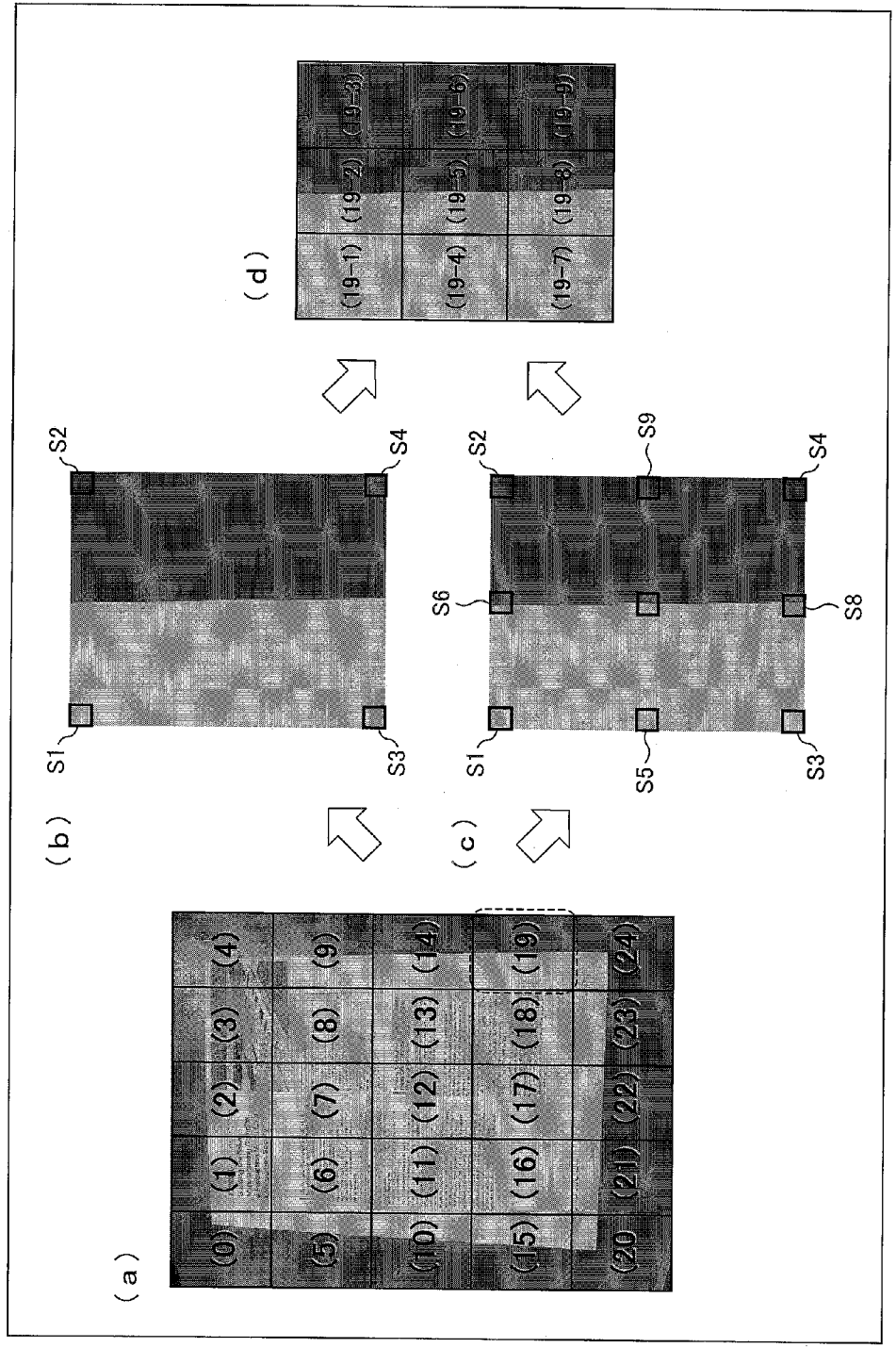
FIG. 14 is a drawing illustrating an example of a subdividing process.

The dividing process section 122 carries out the subdividing process as follows for example. FIG. 14 is a drawing illustrating an example of the subdividing process. The dividing process section 122 calculates, with respect to each color channel, a median of densities of pixels included in each of S1 to S4 which are small regions (e.g. 5×5 pixels) at four corners of the first partial image illustrated as an example in (b) of FIG. 14. In a case where a maximum difference between the medians of the four corners of the first partial image is not less than a predetermined threshold thC (e.g. 10), the dividing process section 122 determines that the first partial image requires the subdividing process. The dividing process section 122 divides the first partial image having been determined to require the dividing process into P×Q (P=Q=3 in the drawing) images, as illustrated in (d) of FIG. 14. That is, in a case where medians of the small regions (S1-S4) are M1-M4, a difference obtained by subtracting the minimum value of the medians from the maximum value of the medians is compared with thC, and when the difference is larger than thC for at least one color channel, the dividing process section 122 subdivides the first partial image. Instead of the difference obtained by subtracting the minimum value of the medians from the maximum value of the medians, variance of medians may be used. Alternatively, an average value of a small region may be used instead of a median of the small region. In a case where the dividing process section 122 carries out the subdividing process, the dividing process section 122 causes information for identifying the first partial image to be subdivided and respective information ((19-1)-(19-9) in (d) of FIG. 14) for identifying the P×Q second partial images obtained by dividing the first partial image to be stored.

Alternatively, values different for each color channel may be set as the threshold thC. For example, in consideration of a conversion equation from the RGB method which is a general video signal method into the Yuv method etc., a visional characteristic of a human for RGB is approximately 3:6:1. Accordingly, a certain threshold thC may be multiplied by inverse numbers of the visional characteristic, i.e. R: 1/3, G: 1/6, and B: 1/1.

The small regions to be selected are not limited to those at four corners. Alternatively, the small regions to be selected may be nine small regions including the small regions at four corners and small regions at intermediate points of the four corners. In a case where the nine small regions are used, with respect to three small regions of each of individual sides and individual diagonal lines, an absolute value of a difference between an average value of the small regions at both ends and a value of the small region at a center may be compared with the threshold thC.

The dividing process section 122 may carry out the subdividing process until the subdividing process is no longer required. That is, the dividing process section 122 also compares a maximum difference between medians of four corners of each of the second partial images with a predetermined threshold so as to determine whether each of the second partial images requires the subdividing process, and when the dividing process section 122 determines that none of the second partial images requires the subdividing process, the dividing process section 122 completes the process. On the other hand, when there is a second partial image which is determined to require the subdividing process, the dividing process section 122 carries out the subdividing process on that second partial image. This allows appropriately correcting even a sharp change in color and/or luminance which cannot be corrected only with use of the first partial images.

(4-3) Histogram Creating Section

Figure 15:
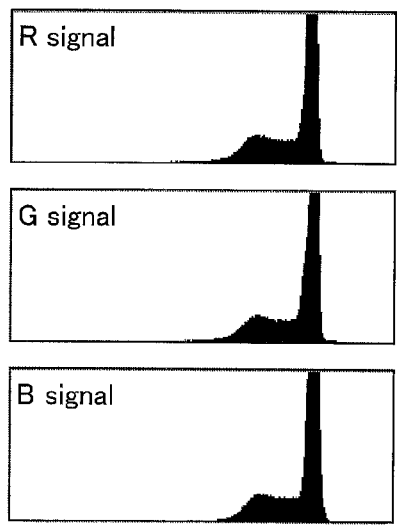
FIG. 15 illustrates examples of histograms for respective color channels.

With respect to each of the partial images into which the dividing process section 122 has divided output target image data, the histogram creating section 123 creates a histogram representing a distribution of the number of pixels for density values (pixel values) with respect to each of color channels constituting the partial image. FIG. 15 illustrates an example of a histogram of each of the color channels. In FIG. 15, a lateral axis indicates a pixel value and a longitudinal axis indicates the number of pixels.

(4-4) Adjustment Value Calculating Section

The adjustment value calculating section 124 calculates, based on the histogram, a temporary adjustment value for adjusting reference correction data. The temporary adjustment value is replaced with an input value at the feature point (d) in the reference correction data.

The adjustment value calculating section 124 calculates a temporary adjustment value based on a peak closest to the maximum value of the pixel values in the histogram of each color channel which histogram has been created for each partial image. In a case where a document with a white page background is captured, the peak closest to the maximum value of the pixel values is normally constituted by pixels of the white page background portion. Accordingly, the adjustment value calculating section 124 can use the pixel value of the white page background portion as the temporary adjustment value.

Figure 16:
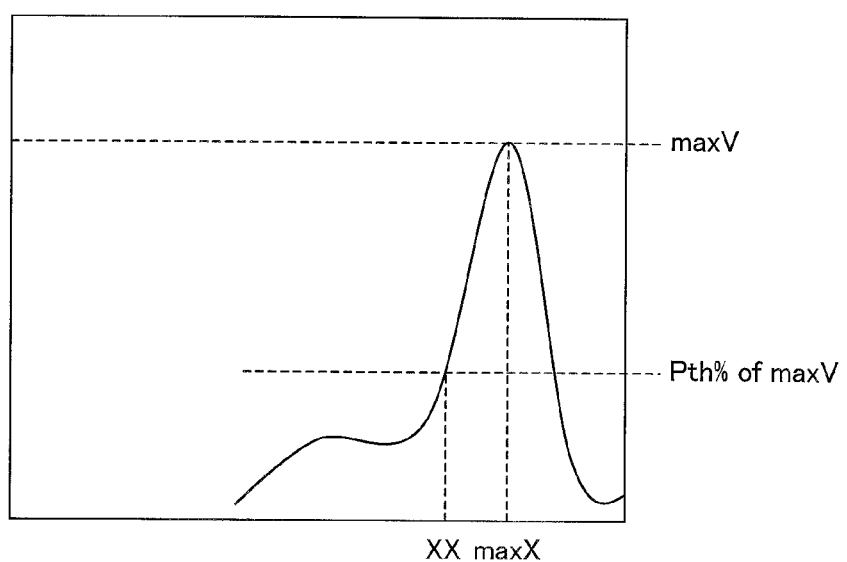
FIG. 16 is a view illustrating an example of how to extract an adjustment value from a histogram.

Specifically, the adjustment value calculating section 124 specifies, in a histogram, a pixel value maxX and the number of pixels maxV at the peak closest to the maximum value (255 here) of the pixel values (peak appearing first in a direction from the maximum value to the minimum value of the pixel values) (see FIG. 16). Next, the adjustment value calculating section 124 multiplies, in the histogram, the number of pixels maxV by a predetermined parameter thP % (e.g. thP=50) so as to obtain a certain number of pixels (maxV×thP/100), and specifies a pixel value XX which is the largest out of pixel values corresponding to the certain number of pixels (maxV×thP/100) and not more than the pixel value maxX. The adjustment value calculating section 124 regards the specified pixel value XX as the temporary adjustment value. Thus, the adjustment value calculating section 124 obtains temporary adjustment values XXR, XXG, and XXB for respective color channels (here R, G, and B).

The parameter thP is set in accordance with an image quality adjustment level set by the image quality adjustment level bar 50 illustrated in FIG. 10. For example, thP: 70% is set for the image quality adjustment level "Mild", thP: 50% is set for the image quality adjustment level "Middle", and thP: 30% is set for the image quality adjustment level "Intensive". In a case of the image quality adjustment level "Not Applied", the adjustment value calculating section 124 does not output the temporary adjustment value.

With respect to the histogram of each color channel which histogram has been created with respect to each partial image, the adjustment value calculating section 124 may obtain the temporary adjustment value similarly with the above based on a peak with the maximum number of pixels, instead of the peak closest to the maximum value of the pixel values. In the case where a document with a white page background is captured, the peak with the maximum number of pixels is also normally constituted by pixels of the white page background portion. Accordingly, the adjustment value calculating section 124 can use the pixel value of the white page background portion as a first adjustment value.

(4-5) Verification Section

The verification section 125 verifies, with respect to each partial image, whether it is appropriate to apply the temporary adjustment value calculated by the adjustment value calculating section 124, and causes a verification flag indicative of the result of the verification to be stored.

Specifically, the verification section 125 determines that application of the temporary adjustment value to a partial image meeting one of the following conditions is inappropriate, and sets the verification flag for the partial image to be invalid (0 here). On the other hand, the verification section 125 sets the verification flag for the partial image which does not meet any of the following conditions to be valid (1 here).

(Condition A): For at least one color channel, a difference between maxX and XX is not less than a predetermined threshold thX (e.g. thX=30).

The partial image meeting the condition A indicates that, in the histogram, a peak closest to the maximum value of the pixel values is broad. This indicates that the partial image has no or little amount of a page background region, as in cases of a photographic region or a drawing. For example, a photographic region exemplified by a region H in FIG. 17 meets the condition A.

(Condition B): A difference between a maximum value and a minimum value out of the adjustment values XXR, XXG, and XXB which were obtained for each color channel is not less than a predetermined threshold thS (e.g. thS=60).

A region where the difference between the maximum value and the minimum value of the adjustment values XXR, XXG, and XXB is large is a region which highly probably includes a locally chromatic background and/or a drawing. For example, a region including a chromatic background, exemplified by a region J in FIG. 17, meets the condition B.

(Condition C): A difference between an adjustment value of a partial image to be verified and a temporary adjustment value of a neighboring partial image is not less than a predetermined threshold thD (e.g. thD=80).

Herein, the difference is obtained based on Euclidean distance for example. Euclidean distance is represented by a square root of a sum of squares of differences for respective color channels. For example, assume that temporary adjustment values for color channels obtained with respect to the partial image to be verified are XXRi, XXGi, and XXBi, respectively, and an average value or a median of temporary adjustment values for color channels obtained with respect to a neighboring partial image are XXRo, XXGo, and XXBo. In this case, a difference Di is obtained by $$Di=\text{SQRT}[(XXRi-XXRo)^2+(XXGi-XXGo)^2+(XXBi-XXBo)^2)]$$

When Di>thD, it is determined that the temporary adjustment value of the partial image to be verified is inappropriate.

Figure 17:
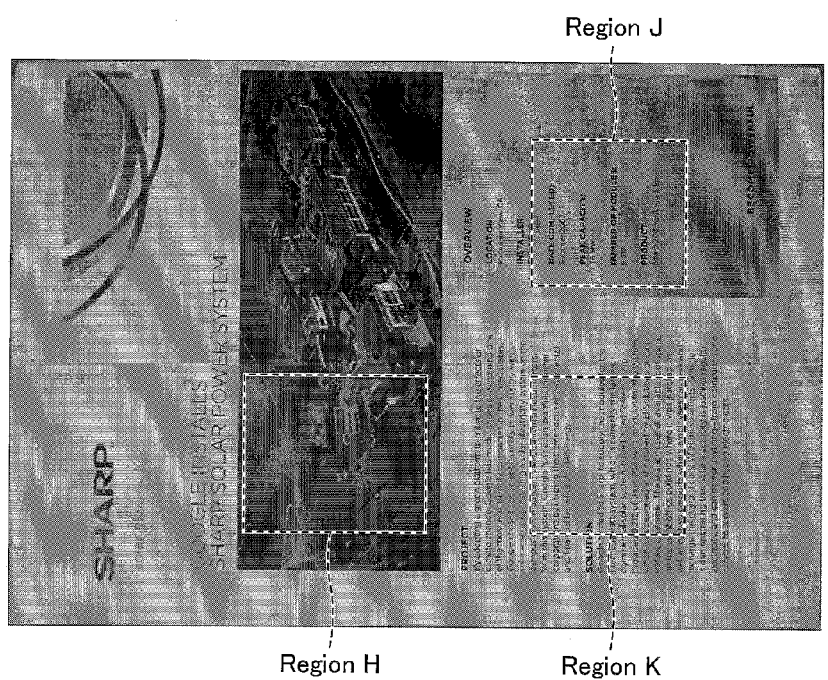
FIG. 17 is a view illustrating an example of an image represented by output target image data.
Figure 17:
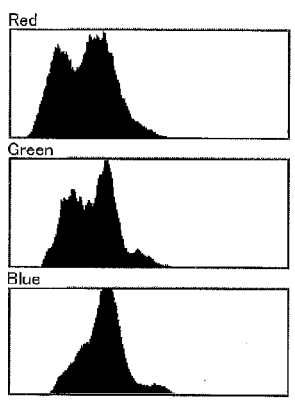
Figure 17:
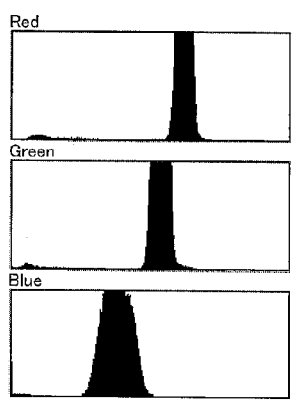
Figure 17:
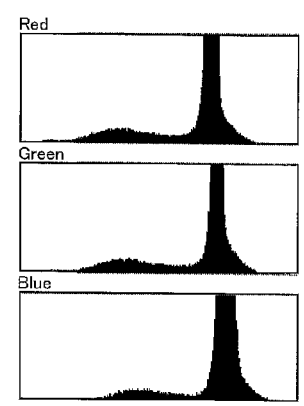

A partial image meeting the condition C is an image having prominently different characteristics from features of more number of partial images surrounding that partial image (e.g. features of a region K in FIG. 17). Similarly with the case of the condition B, a region which highly probably includes a locally chromatic background and/or a drawing meets the condition C. The condition C allows extracting, with higher precision, a region which highly probably includes a locally chromatic background and/or a drawing.

(4-6) Adjustment Value Interpolating Section

An adjustment value interpolating section 126 determines a final adjustment value for each partial image based on the temporary adjustment value calculated by the adjustment value calculating section 124 and the verification flag set by the verification section 125. With respect to the partial image for which the verification flag has been set to be valid by the verification section 125, the adjustment value interpolating section 126 regards the temporary adjustment value calculated by the adjustment value calculating section 124 as the final adjustment value. On the other hand, with respect to the partial image for which the verification flag has been set to be invalid by the verification section 125, the adjustment value interpolating section 126 calculates the final adjustment value based on an adjustment value of a partial image which neighbors that partial image and for which a verification flag has been set to be valid. For example, the adjustment value interpolating section 126 may calculate the final adjustment value with use of a smoothing filter etc. using only an adjustment value of a neighboring partial image for which a verification flag has been set to be valid.

Specifically, the adjustment value interpolating section 126 calculates a final adjustment value XXRij for a color channel R of a partial image at i-th row and j-th column (see FIG. 13), in accordance with equations below.

$$\text{sum}VRij = \sum_{m=i-1}^{i+1}\sum_{n=j-1}^{j+1}(XXRmn)\times(FLGmn) \quad \text{[Math. 1]}$$

$$\text{sum}FLGij = \sum_{m=i-1}^{i+1}\sum_{n=j-1}^{j+1}(FLGmn)$$

Final adjustment value $XXRji =$ $$\begin{cases} \text{sum}VRij/\text{sum}FLGij & FLGij = 0 \ \& \ \text{sum}FLGij > 0 \\ \text{Temporary adjustment value } XXRij & FLGij = 1 \\ \text{Not Set} & FLGij = 0 \ \& \ \text{sum}FLGij = 0 \end{cases}$$

Herein, XXRmn is an adjustment value for the color channel R of a partial image at m-th row and n-th column. In a case where the final adjustment value has been set, XXRmn is the final adjustment value, and in a case where the final adjustment value has not been set, XXRmn is the temporary adjustment value. FLGmn is a value of a verification flag set to the partial image at m-th row and n-th column. As described above, the verification flag "1" indicates being valid and "0" indicates being invalid. In the equations above, when calculating a final adjustment value of a partial image at an end of an image, there is a case where m or n is 0 or a value larger than a possible maximum value. In this case, the final adjustment value XXRij may be calculated with a condition that XXXRmn=FLGmn=0.

A case where FLGij=0 and sumFLGj>0 is a case where the verification section 125 sets a verification flag indicative of being invalid to a partial image which is a target of setting and where at least one neighboring partial image to which a verification flag indicative of being valid is set exists. In this case, according to the Math. 1, the final adjustment value XXRij=sumVRij/sumFLGj. That is, an average value of adjustment values for only neighboring partial images for which the verification flag indicative of being valid is set is calculated as a final adjustment value for a partial region which is a target of setting.

A case where FLGij=1 is a case where the verification section 125 sets the verification flag indicative of being valid to a partial image which is a target of setting. In this case, according to the Math. 1, the final adjustment value XXRij=the temporary adjustment value XXRij.

A case where FLGij=0 and sumFLGj=0 is a case where the verification section 125 sets the verification flag indicative of being invalid to a partial image which is a target of setting and where a neighboring partial image to which the verification flag indicative of being valid is set does not exist. In this case, the final adjustment value is not set.

Furthermore, the verification flag set to the partial region which is a target of setting is changed as follows.

$$FLGij = \begin{cases} 1 & FLGij = 1, FLGij = 0 \ \& \ \text{sum}FLGij > 0 \\ 0 & FLGij = 0 \ \& \ \text{sum}FLGij = 0 \end{cases} \quad \text{[Math. 2]}$$

Specifically, in a case where FLGij=1, FLGij is kept to be 1. In a case where sumFLGj>0, that is, in a case where at least one neighboring partial image to which the verification flag indicative of being valid is set exists, the final adjustment value XXRij is set to be sumVRij/sumFLGj in accordance with the Math. 1 as above, and the verification flag of the partial image which is a target of setting is changed to the verification flag indicative of being valid (FLGij=1). On the other hand, in a case where sumFLGj=0, that is, in a case where no neighboring partial image to which the verification flag indicative of being valid is set exists, the verification flag of the partial image which is a target of setting is kept to be the verification flag indicative of being invalid (FLGij=0).

Such a process is repeated until the verification flags of all the partial images become valid ("1"). For example, in a case where verification flags initially set by the verification section 125 are as illustrated in (a) of FIG. 18, applying the above process twice allows determining final adjustment amounts for all the partial images (see (b) of FIG. 18). The final adjustment values for individual partial images at a time when all the verification flags are set to be valid are outputted to a subsequent stage.

The method for calculating the final adjustment value in the case where FLGij=0 and sumFLGj>0 is not limited to the method in accordance with the Math. 1. For example, instead of an average value of adjustment values for neighboring partial images, a weighted average may be obtained using filter coefficients in FIG. 19.

In a case where the dividing process section 122 has subdivided the first partial image into the second partial images, a final adjustment value for a partial image which is a target of setting may be calculated using an adjustment value for a neighboring first partial image or second partial image in accordance with a size of the second partial images into which the first partial image has been subdivided (see FIG. 20). For example, in a case where the verification flag of a second partial image (19-1) in FIG. 20 indicates being invalid, the final adjustment value may be calculated in accordance with the Math. 1 based on the assumption that there exist partial images neighboring the second partial image (19-1), which include a partial image (13) at an upper left of the second partial image (19-1), a partial image (14) above the second partial image (19-1), the partial image (14) also at an upper right of the second partial image (19-1), a partial image (18) at a left of the second partial image (19-1), the partial image (18) also at a lower left of the second partial image (19-1), a partial image (19-2) at a right of the second partial image (19-1), a partial image (19-4) below the second partial image (19-1), and a partial image (19-5) at a lower right of the second partial image (19-1).

In a case where a verification flag of a first partial region which neighbors a second partial image and which is not subdivided indicates being invalid, an average value of a plurality of second partial regions neighboring that second partial image is used. For example, in a case where the first partial image (14) in FIG. 20 is a partial image which is a target of setting, an average value of adjustment values for the second partial image (19-1), the second partial image (19-2), and the second partial image (19-3) is used as an adjustment value for the first partial image (19) below the first partial image (14). In a case where the first partial image (18) is a partial image which is a target of setting, an average value of adjustment values for the second partial image (19-1), the second partial image (19-4), and a second partial image (19-7) is used as an adjustment value for the first partial image (19) at a right of the first partial image (18).

(4-7) Adjusting Section

The adjusting section 127 generates, with respect to each partial image, tone correction data based on the final adjustment values for partial images which values have been outputted from the adjustment value interpolating section 126. Specifically, the adjusting section 127 replaces an input value at the feature point (d) of reference correction data read by the image correction amount reading section 121 with the final adjustment value. Furthermore, the adjusting section 127 replaces respective input values at the feature points (b) and (c) with values obtained by multiplying the respective input values at the feature points (b) and (c) by (final adjustment value)/(input value at feature point (d) of reference correction data). For example, in a case where the reference correction data illustrated in FIG. 12 is read and the final adjustment value is 160, the adjusting section 127 changes the input value at the feature point (d) from 200 to 160. Furthermore, the adjusting section 127 replaces the respective input values at the feature points (b) and (c) with values obtained by multiplying the respective input values at the feature points (b) and (c) by 160/200. Then, the adjusting section 127 carries out cubic spline interpolation or linear interpolation using updated values at the feature points (a)-(e) and obtains output values responding to input values at points other than the feature points. The adjusting section 127 generates a one-dimensional lookup table for tone correction, in which input values for all tone values are associated with output values one by one. The adjustment value generates, with respect to each partial image, the one-dimensional lookup table corresponding to each color channel.

(4-8) Correction Process Section

The correction process section 128 generates corrected image data by carrying out, with respect to each partial image of the output target image data, tone correction based on the one-dimensional lookup table for tone correction which table has been obtained by the adjusting section 127. The correction process section 128 causes the generated corrected image data to be stored in the storage section 108 in such a manner that the generated corrected image data is associated with the output target image data.

However, since different one-dimensional lookup tables are provided with respect to each partial image, there is a possibility that unnatural lines appear at boundaries between partial images. Accordingly, it is preferable that tone correction is performed by interpolation calculation as follows.

Initially, the correction process section 128 divides a partial region by a lateral dividing line passing through a center of the partial region and a longitudinal dividing line passing through the center of the partial region into four regions, and determines which one of the four divided regions a target pixel belongs to. The divided regions include an upper left region, an upper right region, a lower left region, and a lower right region.

In a case where the target pixel belongs to the upper left region, the correction process section 128 regards the partial region to which the target pixel belongs (target partial region) as a lower right partial region RB, regards a partial region positioned above the target partial region as an upper right partial region RU, regards a partial region positioned at a left of the target partial region as a lower left partial region LB, and regards a partial region positioned at an upper left of the target partial region as an upper left partial region LU.

In a case where the target pixel belongs to the upper right region, the correction process section 128 regards the partial region to which the target pixel belongs (target partial region) as a lower left partial region LB, regards a partial region positioned above the target partial region as an upper left partial region LU, regards a partial region positioned at a right of the target partial region as a lower right partial region RB, and regards a partial region positioned at an upper right of the target partial region as an upper right partial region RU.

In a case where the target pixel belongs to the lower left region, the correction process section 128 regards the partial region to which the target pixel belongs (target partial region) as an upper right partial region RU, regards a partial region positioned below the target partial region as a lower right partial region RB, regards a partial region positioned at a left of the target partial region as an upper left partial region LU, and regards a partial region positioned at a lower left of the target partial region as a lower left partial region LB.

In a case where the target pixel belongs to the lower right region, the correction process section 128 regards a partial region to which the target pixel belongs (target partial region) as an upper left partial region LU, regards a partial region positioned below the target partial region as a lower left partial region LB, regards a partial region positioned at a right of the target partial region as an upper right partial region RU, and regards a partial region positioned at a lower right of the target partial region as a lower right partial region RB.

Next, as illustrated in (b) of FIG. 21, with respect to the target pixel P, a ratio s: 1-s which is a ratio of a lateral distance between a center of the upper left partial region LU (or lower left partial region LB) and the target pixel P to a lateral distance between a center of the upper right partial region RU (or lower right partial region RB) and the target pixel P is obtained. Similarly, with respect to the target pixel P, a ratio t: 1-t which is a ratio of a longitudinal distance between a center of the upper left partial region LU (or upper right partial region RU) and the target pixel P to a longitudinal distance between a center of the lower left partial region LB (or lower right partial region RB) and the target pixel P is obtained.

Then, the correction process section 128 calculates a tone-corrected output value for the target pixel P in accordance with an equation (1) below. In the equation (1) below, x represents a density value (pixel value) of the target pixel P in the output target image data before tone correction. LU(x) represents an output value corresponding to the pixel value x in a case where the one-dimensional lookup table obtained by the adjusting section 127 is applied to the upper left region LU. RU(x) represents an output value corresponding to the pixel value x in a case where the one-dimensional lookup table obtained by the adjusting section 127 is applied to the upper right region RU. LB(x) represents an output value corresponding to the pixel value x in a case where the one-dimensional lookup table obtained by the adjusting section 127 is applied to the lower left region LB. RB(x) represents an output value corresponding to the pixel value x in a case where the one-dimensional lookup table obtained by the adjusting section 127 is applied to the lower right region RB.

$$Out=(1-t)*\{(1-s)*LU(x)+s*RU(x)\}+t*\{(1-s)*LB(x)+s*RB(x)\} \quad \text{Equation (1)}$$

In a case where the target pixel P is positioned on a partial image at an end part of a whole image in such a manner that the target pixel P is closer to the end part of the whole image, at least one of the upper left partial image LU, the upper right partial image RU, the lower left partial image LB, and/or the lower right partial image RB does not exist (see (a) and (c) of FIG. 21). In a case where the target pixel P exists at an upper end of the image, the upper left partial image LU and the upper right partial image RU do not exist, and therefore a tone-corrected output value may be calculated according to the equation (1) above where t=1. Similarly, in a case where the target pixel P exists at a lower end part of the image, a tone-corrected output value may be calculated according to the equation (1) where t=0. In a case where the target pixel P exists at a left end part of the image, a tone-corrected output value may be calculated according to the equation (1) where s=1. In a case where the target pixel P exists at a right end part of the image, a tone-corrected output value may be calculated according to the equation (1) where s=0.

(4-9) Examples of Processing

Next, a description will be made as to specific examples of processing in the image processing section. Here, a description will be made as to a case where an image represented by output target image data to be corrected is one illustrated in FIG. 22. As illustrated in FIG. 22, a lower right region of the image is darker than other regions due to illumination environment etc. when the image was captured. Assume here that a page background of a document to be captured is white, whereas the output target image data is yellowish as a whole.

The dividing process section 122 divides the output target image data illustrated in FIG. 22 into a plurality of partial images. The plurality of partial images include a partial image (1) at an upper left and a partial image (2) at a lower right, as illustrated in FIG. 22.

A left part of FIG. 23 illustrates histograms created by the histogram creating section 123 with respect to the partial image (1). In a region such as the partial image (1), a large part of which is occupied by a page background portion of the captured target, a peak closest to the maximum value of the pixel values is constituted by pixels at the page background portion. As described above, since the partial image (1) does not drop its brightness but is yellowish, density value (pixel value) of B at its peak is lower, although density values (pixel values) of R and G at their peaks are high.

A right part of FIG. 23 illustrates temporary adjustment values calculated by the adjustment value calculating section 124 from the histograms. The temporary adjustment values of R and G are high, whereas the temporary adjustment value of B is low.

A left part of FIG. 24 illustrates histograms created by the histogram creating section 123 with respect to the partial image (2). Since a large part of the partial image (2) is occupied by the page background portion of the captured target, too, a peak closest to the maximum value of the pixel values is constituted by pixels at the page background portion. However, as described above, the partial image (2) is darker than other regions due to the illumination environment etc. and is yellowish. Consequently, density values (pixel values) of R, G, and B at their peaks are lower than those in the partial image (1), and the density value (pixel value) of B at its peak is lower than those of R and G.

A right part of FIG. 24 illustrates temporary adjustment values calculated by the adjustment value calculating section 124 from the histograms. The temporary adjustment values of R, G, and B are lower than the temporary adjustment values of the partial image (1) illustrated in FIG. 23, and the temporary adjustment value of B is lower than those of R and G.

Next, the verification section 125 makes verification with respect to each partial image. Assume that verification flags for the partial images (1) and (2), respectively, are set to be valid. In this case, the adjustment value interpolating section 126 sets the temporary adjustment values in FIGS. 23 and 24 as final adjustment values.

Next, as illustrated in FIG. 25, the adjusting section 127 replaces the input value at the feature point (d) of the reference correction data with the final adjustment value, and generates one-dimensional lookup table for tone correction. As described above, respective input values at the feature points (b) and (c) are adjusted together with the replacement of the input value at the feature point (d) with the final adjustment value.

FIG. 26 is a view graphing the one-dimensional lookup table obtained by the adjusting section 127 with respect to the partial image (1). As illustrated in FIG. 26, R and G have lower output values than the reference toner correction curve, and B has a higher output value than the reference tone correction curve. By the correction process section 128 carrying out tone correction on the partial image (1) according to the one-dimensional lookup table illustrated in FIG. 26, yellowish color of the page background portion is corrected to be white, while hardly changing luminance of the image as a whole.

FIG. 27 is a view graphing the one-dimensional lookup table obtained by the adjusting section 127 with respect to the partial image (2). As illustrated in FIG. 27, R, G, and B have higher output values than those on the reference toner correction curve. Consequently, by the correction process section 128 carrying out tone correction on the partial image (2), luminance of the page background portion of the partial image (2) is increased to be substantially as high as that of the partial image (1). Furthermore, B has higher output values than those of R and G. Consequently, the yellowish color of the page background portion is corrected to be white.

By carrying out such correction, it is possible to replace the color of a part with the maximum luminance of a captured image and neighboring parts thereof with white, thereby removing color fogging and background color. That is, it is possible to whiten a page background portion of the captured target with even luminance.

(5) Transfer of Output Target Image Data to Image Forming Apparatus

A user with the mobile terminal apparatus 100 comes close to the image forming apparatus 200 or the image display apparatus 300, operates the mobile terminal apparatus 100 so as to transmit output target image data to the image forming apparatus 200 or the image display apparatus 300 with the use of a short-range wireless communication method such as infrared communication. Specifically, the user inputs, to the input section 106 of the mobile terminal apparatus 100, an instruction to transmit the output target image data or the corrected image data.

In accordance with the instruction to transmit the output target image data or the corrected image data, the control section 109 specifies the output target image data or the corrected image data stored in the storage section 108. The user checks the screen illustrated in FIG. 10, and when the user considers that the corrected image data is preferable to the output target image data, the user may designate the corrected image data as a transmission target, and when the user considers that the output target image data has no problem, the user may designate the corrected image data as a transmission target. Then, the control section 109 causes the communication section 104 to execute processing of transmitting the output target image data or the corrected image data to the image forming apparatus 200 or the image display apparatus 300. Note that the communication section 104 transmits, together with the output target image data or the corrected image data, a file name associated with the output target image data or the corrected image data, output processing information, and model information and user information that are stored in the storage section 108.

(6) Configuration of Image Forming Apparatus

Next, the following describes a configuration of the image forming apparatus 200 of the present embodiment. In the present embodiment, the image forming apparatus 200 is a multifunction printer that has functions of a scanner, a printer, a copying machine, and the like.

FIG. 28 is a block diagram illustrating a configuration of the image forming apparatus 200. The image forming apparatus 200 includes an image reading section 201, an image processing section 202, an authenticating section 203, an image forming section 204, a display section 205, an input section 206, a first communication section 207, a second communication section 208, a storage medium access section 209, a storage section 210, and a control section 212.

The image reading section 201, which is for reading a document, has a scanner section provided with a CCD (Charge Coupled Device). The image reading section 201 converts light reflected from a document into an electrical signal (analog image signal) separated into R, G and B, and outputs this electrical signal.

The image processing section 202 is for carrying out predetermined image processing with respect to image data. In the present embodiment, the image processing section 202 carries out predetermined image processing with respect to image data received from the mobile terminal apparatus 100 or the image display apparatus 300. Details of the image processing in the image processing section 202 will be described later.

The authenticating section 203 authenticates a user when the processing of outputting the image data received from the mobile terminal apparatus 100 or the image display apparatus 300 is carried out. Specifically, the authenticating section 203 authenticates a user by comparing the user information received from the mobile terminal apparatus 100 and user information (user ID and password) inputted to the input section 206. The authenticating section 203 sends a result of the authentication to the control section 212.

The image forming section 204 forms an image on a recording sheet such as paper with the use of a method such as an electrophotographic printing method or an inkjet method. That is, the image forming section 204 executes, as one of the output processing, printing processing of printing an image represented by the corrected image data onto recording paper such as a recording sheet or an OHP sheet.

The display section 205 is, for example, made up of a liquid crystal display etc. The input section 206 is a section to which data is inputted, for example, by pressing a touch panel on the liquid crystal display or a button.

The first communication section 207 has functions of serial transfer, parallel transfer based on a standard such as USB1.1 or USB2.0, and wireless data communication. The first communication section 207 receives, from the mobile terminal apparatus 100 or the image display apparatus 300, image data (output target image data or corrected image data) together with the file name, the mode information of the mobile terminal apparatus 100, the user information, and the output processing information.

The second communication section 208 has functions of (a) data communication utilizing a wireless technique based on any one of IEEE802.11a, IEEE802.11b, and IEEE802.11g, each of which is a standard of wireless LAN, (b) data communication, via a LAN cable, with a network having a function of a communication interface utilizing Ethernet (Registered Trademark), and (c) data communication utilizing a wireless technique based on any one of IEEE802.15.1 (so-called Bluetooth (Registered Trademark)), an infrared communication standard such as IrSimple, and a communication method such as Felica (Registered Trademark), each of which is a wireless communication standard.

The second communication section 208 executes, as output processing, filing processing of storing, in a server, the image data that has been subjected to the predetermined image processing in the image processing section 202 or e-mail sending processing of sending an e-mail to which the image data that has been subjected to the predetermined image processing is attached.

The storage medium access section 209 reads out a program from a storage medium in which the program is recorded. The storage section 210 is a section in which the program for causing each section to execute processing is stored.

The control section 212 controls each section of the image forming apparatus 200. Specifically, when the first communication section 207 receives image data (output target image data or corrected image data) from the mobile terminal apparatus 100 or the image display apparatus 300, the control section 212 supplies the image data to the image processing section 202 and then causes the image processing section 202 to execute the image processing. Moreover, the control section 212 supplies, to the authenticating section 203, the user information attached to the image data, and then causes the authenticating section 203 to execute the authenticating processing. Upon receipt of an authentication result indicating successful authentication from the authenticating section 203, the control section 212 causes any of the sections to execute processing on the basis of output processing information attached to the image data. Specifically, in a case where the output processing information represents the printing processing, the control section 212 causes the image forming section 204 to execute printing based on the image data having been subjected to image processing by the image processing section 202. Meanwhile, in a case where the output processing information indicates the filing processing or the e-mail sending processing, the control section 212 causes the second communication section 208 to execute the filing processing or the e-mail sending processing based on the image data having been subjected to image processing by the image processing section 202.

(7) Image Processing in Image Processing Section

Next, the following describes details of the image processing executed by the image processing section 202. Note that the following description discusses image processing carried out on image data (output target image data or corrected image data) received from the mobile terminal apparatus 100 or the image display apparatus 300 although the image processing section 202 carries out image processing also on image data read by the image reading section 201.

FIG. 29 is a block diagram illustrating an internal configuration of the image processing section 202. As illustrated in FIG. 29, the image processing section 202 includes an image quality adjusting section 221, a geometrical correction section (mapping generating section) 222, a lens distortion correction section 223, a high-resolution correction section 225, and an output image processing section 224. The following describes specific processing carried out by these sections.

(7-1) Image Quality Adjusting Section

The image quality adjusting section 221 corrects color balance and contrast of the output target image data. The image quality adjusting section 221 calculates a maximum value and a minimum value of each color channel of the received output target image data, creates a look-up table in which the maximum value and the minimum value are made uniform, and applies the look-up table to each color channel. Specifically, the image quality adjusting section 221 just need create, as the look-up table, a table as illustrated in FIG. 30 in which MN is increased by increments of (MX-MN)/255 where MX is a maximum value of a certain channel, MN is a minimum value of the channel, and data is 8-bit data. Then, the image quality adjusting section 221 converts each pixel value in accordance with the created table. In this way, the color balance is corrected.

The image quality adjusting section 221 corrects contrast in s similar manner. Note that the look-up tables to be applied to respective color channels may be identical to each other if it is unnecessary to change the color balance.

Note that other known techniques may be used to correct color balance and contrast.

In a case where corrected image data is received from the mobile terminal apparatus 100, the processing by the image quality adjusting section 221 may be omitted since the corrected image data has been already subjected to image quality adjustment.

(7-2) Lens Distortion Correction Section

The lens distortion correction section 223 executes correction of lens distortion with respect to image data.

The lens distortion correction section 223 carries out the following processing with respect to the image data. Specifically, the lens distortion correction section 223 detects edge pixels of a captured object in a captured image in a similar manner to the processing described in (3-2) above. Then, the lens distortion correction section 223 carries out curve approximation of the detected edge pixels, and then carries out lens distortion correction on the basis of the equation of the obtained curve.

Specifically, the lens distortion correction section 223 detects edge pixels of a detected captured object, and classifies the edge pixels into four groups of edge pixels that correspond to four sides of a boundary between the captured object and a background in a similar manner to the processing described in (3-2) above. Then, the lens distortion correction section 223 carries out quadratic curve approximation with respect to the edge points each belonging to any of the groups as indicated by the solid line in FIG. 31. The quadratic curves obtained for the four groups correspond to the four sides of the captured object. Moreover, the lens distortion correction section 223 calculates intersections of the four quadratic curves which intersections correspond to corners of a region surrounded by the four quadratic curves. Next, the lens distortion correction section 223 determines a bound box (indicated by the dash dot line in FIG. 31) that circumscribes the quadratic curves obtained for the respective sides and is similar to a quadrangle (indicated by the dotted line in FIG. 31) obtained by connecting the four intersections. Then, the lens distortion correction section 223 converts positions of pixels within a region of the captured object in the captured image so that the determined bound box is located on the edge pixels of the corrected object. This conversion may be calculated based on a vector from a reference point (e.g. center of gravity of the region of the captured object). In this way, it is possible to correct lens distortion caused by the image-capturing section 101 of the mobile terminal apparatus 100.

A method for correcting lens distortion is not limited to the aforementioned method, and can be a known method.

(7-3) Geometrical Correction Section

The geometrical correction section 222 corrects distortion of a rectangular captured object, such as a poster or manuscript paper, which distortion is caused by capturing the captured object from a direction different from a normal to a plane on which a document image is formed (i.e. distortion of a rectangular plane on which the document image is formed) and corrects skew of the captured object in image data.

Specifically, as with the geometrical arrangement detecting section 111, the geometrical correction section 222 determines equations of straight lines corresponding to four groups of edge pixels that serve as a boundary between a rectangular captured object and a background on the basis of output target image data. Then, the geometrical correction section 222 specifies a quadrangular region (pre-corrected region) surrounded by the four straight lines, and cuts out the specified pre-corrected region.

Next, the geometrical correction section 222 obtains a mapping for converting the specified rectangular pre-corrected region (indicated by the dash dot line in FIG. 32) into a rectangular standard region (e.g. 7:10 in the case of A size and B size used for business documents; indicated by the solid line in FIG. 32) whose upper and lower sides are substantially parallel with a lateral direction and which has a predetermined aspect ratio and a predetermined size as illustrated in FIG. 32. Note that the upper and lower sides of the standard region need not necessarily be completely parallel with the lateral direction and may be tilted by a small angle within a predetermined range with respect to the lateral direction (may be substantially parallel with the lateral direction). Note that a mapping section rules fx and fy for mapping conversion (coordinate conversion) from coordinates (x1, y1) of each pixel of the pre-corrected region to coordinates (x2, y2) of a corresponding pixel of the standard region, and is expressed by the following equations: $x2=fx(x1, y1)$ and $y2=fy(x1, y1)$. A known technique can be used as the mapping conversion. Note that the geometrical correction section 222 may carry out the conversion in conformity with an aspect ratio stored in advance in the storage section 210 or may carry out the conversion in conformity with an aspect ratio inputted to the input section 206. A size of the standard region may be one inputted to the input section 206 or may be one whose area is the same as the pre-corrected region.

Next, the geometrical correction section 222 carries out the coordinate conversion with respect to the pre-corrected region that has been cut out from the image data in accordance with the mapping. This makes it possible to correct geometrical distortion and skew (this correction is hereinafter sometimes referred to as geometrical correction).

A method for the geometrical correction is not limited to the aforementioned method, and can be a known method.

(7-4) High-Resolution Correction Section

The high-resolution correction section 225 carries out high-resolution correction with respect to image data. In the present embodiment, the high-resolution correction section 225 may carry out the high-resolution correction on the basis of a single piece of image data, or may carry out the high-resolution correction on the basis of plural pieces of image data.

Typically, high-resolution correction can be executed by detecting an edge direction of an image pattern, carrying out interpolation in accordance with the direction, and carrying out a noise removal process for the purpose of removing influences of distortion caused by the interpolation, a noise component present in an input image, etc.

The method for carrying out the high-resolution correction on the basis of a single piece of image data may be one described in Japanese Patent Application Publication No.

2010-245788, and the method for carrying out the high-resolution correction on the basis of plural pieces of image data may be one described in Japanese Patent Application Publication No. 2010-245787.

(7-5) Output Image Processing Section

The output image processing section 224 executes a segmentation process, a color correction process, a black generation and under color removal process, a spatial filter process, and a halftone process when image data is output. Note that these processes may be executed by known techniques.

(8) Modification

The captured image processing system of the present invention is not limited to the above embodiments, and may be modified in various manners. The following description will discuss specific modifications.

(8-1) Determination by Output Target Image Determining Section

A description was made above as to a case where the output target image determining section 113 determines, as output target image data, image data representing a captured image displayed by the display section 105 at timing when a shutter button (reference sign 10 in FIG. 7) is operated while the display processing section 112 causes the display section 105 to display information indicating that a captured object is within a captured image area (e.g. "OK").

Alternatively, the output target image determining section 113 may have an automatic shutter function for automatically determining output target image data, instead of the operation on the shutter button 10.

That is, in a case where the automatic shutter function is valid, when the display processing section 112 causes the display section 105 to display, for predetermined number of captured images (frame images) sequentially captured by the image-capturing section 101, information indicating that a captured object is within a captured image area, the output target image determining section 113 determines, as output target image data, image data representing one of the predetermined number of captured images (e.g. lastly captured image).

To be more specific, the output target image determining section 113 causes coordinates of four vertexes (excluding provisional vertex coordinates), which are represented by extraction result information outputted from the geometrical arrangement detecting section 111, of the predetermined number (e.g. 30) of captured images (frame images) sequentially captured by the image-capturing section 101 to be stored. In a case where a square of a difference among coordinates of each vertex of the predetermined number of captured images is less than a predetermined threshold, the output target image determining section 113 determines, as the output target image data, image data representing a captured image displayed by the display section 105.

The predetermined threshold is, for example, as follows.

(Height of captured image area $Ymax \times \frac{1}{16})^2$+(width of captured image area $Xmax \times \frac{1}{16})^2$ This allows determining output target image data without a user operating a shutter button. Accordingly, it is possible to prevent a captured object from being blurred or being out of a captured image area due to operation on the shutter button.

(8-2) Image Display Apparatus

The image display apparatus 300 may include the image processing section 202 included in the image forming apparatus 200. The image display apparatus 300 may carry out an output process which is a display process for displaying an image represented by corrected image data obtained by subjecting output target image data to the geometrical correction and the high-resolution correction.

(8-3) Mobile Terminal Apparatus

In a case where an object is captured under a bad condition, there is a possibility that an image of the captured object is difficult to review even after the image processing section 103 has carried out image quality adjustment on the image.

In order to deal with this, the mobile terminal apparatus 100 may be arranged to determine whether output target image data represents an image captured under a condition which enables the image process in the image forming apparatus to be valid, and urge a user to re-capture an image depending on the result of the determination.

For example, the mobile terminal apparatus 100 may determine brightness, contrast, color balance, blurring (strong camera shake) etc.

As for brightness, there is a case where overexposure (too bright) or underexposure (too dark) requires capturing an image again. For example, the control section 109 calculates the maximum value and the minimum value of pixel values of output target image data, and when the maximum value is not more than a certain threshold (e.g. 100 in 8 bit), the control section 109 determines the output target image data as underexposure, and when the minimum value is not less than a certain threshold (e.g. 150 in 8 bit), the control section 109 determines the output target image data as overexposure.

As for contrast, when a difference between the maximum value and the minimum value of pixel values of the output target image data is not more than a predetermined threshold, the control section 109 determines the output target image data as not having a sufficient contrast.

In determining brightness and contrast, the control section 109 may determine brightness and contrast with respect to each color channel, or may use an average value {(R+G+B)/3} or a brightness value (0.299×R+0.587×G+0.114×B: in compliance with NTSC).

As for color balance, it is possible to grasp that a certain channel has excessive deviations by comparison of an average value, the maximum value, and the minimum value of each color channel (RGB). Accordingly, the control section 109 calculates an average value (Ra, Ga, Ba) of values of individual color channels of a pixel whose brightness is equal to or close to the maximum brightness (maximum brightness to maximum brightness−5 or so), and in a case where a difference between the maximum value and the minimum value of each color channel is not less than a certain value [Max (Ra, Ga, Ba)−Min (Ra, Ga, Ba)>0.1× Max (Ra, Ga, Ba)], the control section 109 determines the output target image data as not having sufficient color balance.

In a case where the control section 109 determines the output target image data as underexposure, overexposure, not having a sufficient contrast, or not having sufficient color balance, the control section 109 causes the display section 105 to display a message which urges a user to capture an image again.

(8-4) Timing of Transmitting Image Data from Mobile Terminal Apparatus to Image Forming Apparatus A description was made above as to a case where image data accumulated in a document capturing mode is accumulated in the mobile terminal apparatus 100, and at timing when an instruction for transmission is inputted, the image data having been accumulated so far are transmitted at the same time. However, timing of transmitting image data from the mobile terminal apparatus 100 to the image forming apparatus 200 is not limited to this.

For example, every time when output target image data or corrected image data is stored in the storage section 108, the output target image data or the corrected image data may be transmitted to the image forming apparatus 200. In this configuration, in most cases, a user is not present near the image forming apparatus 200. Accordingly, the communication section 104 of the mobile terminal apparatus 100 may transmit image data to the image forming apparatus 200 via a portable phone network and the Internet.

(8-5) Output Processing Information

A description was made above as to a case where the mobile terminal apparatus 100 obtains output processing information and transmits the output processing information to the image forming apparatus 200. Alternatively, the image forming apparatus 200 may obtain output processing information (information representing type of an output process and setting condition for the output process) when the image forming apparatus 200 obtains user information for user authentication.

(8-6) Output Process

In the image forming apparatus 200, the control section 212 may convert image data generated in the image processing section 202 into a hyper compressed PDF before carrying out a filing process or an e-mail sending process. Hyper compressed PDF data is PDF data obtained by separating a background portion and a text portion in image data and subjecting the background portion and the text portion to optimal compression processes, respectively. This ensures good legibility and reduction in image file size.

The control section 212 may carry out an OCR process on image data generated by the image processing section 202, before carrying out a filing process or an e-mail sending process on the image data, thereby generating text data. Then, the control section 212 may convert the image data into PDF and add the generated text data as a transparent text to the PDF. The transparent text is data for overlapping (embedding) recognized characters as text information on (in) image data in such a manner that the characters do not appear to a user. For example, in a PDF file, an image file obtained by adding a transparent text to image data is used generally. The control section 212 may output PDF data with the generated transparent text. This allows outputting an electronic document with high utility, such as a file which allows text search.

(9) Program and Storage Medium

The present invention encompasses a computer-readable storage medium in which a program to be executed by a computer is stored and in which a method for transmitting an image captured by the mobile terminal apparatus 100 to the image forming apparatus 200 and outputting the image from the image forming apparatus 200 is stored.

Consequently, it is possible to provide a portable storage medium in which a program code for carrying out the above processes (executable program, intermediate code program, and source program) is stored.

In the present embodiment, the storage medium may be a program medium composed of a memory (e.g. ROM) which is not illustrated because the process is carried out in a microcomputer, or may be a program medium which is readable by inserting a storage medium to a program-reading apparatus (not illustrated) serving as an external storage apparatus.

In either case, the stored program may be accessed and executed by a microprocessor. Alternatively, in either case, the program code may be read out and downloaded to a program storage area (not illustrated) of a microcomputer so that the program is executed. A program for downloading may be stored in a main apparatus in advance.

It should be noted here that the program medium is a non-transitory tangible medium arranged to be separable from the main body. The storage medium may be, for example, a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another storage medium. The present invention can be realized in the form of a computer data signal, embedded in a carrier wave, in which the program code is embodied electronically.

The storage medium is read by a program-reading apparatus provided in the mobile terminal apparatus 100 or the image forming apparatus 200, whereby the aforementioned image processing method is executed.

(10) Summary

An image processing apparatus in accordance with first aspect of the present invention includes: a reference data obtaining section configured to obtain predetermined reference data representing correspondences between a plurality of input values and their corresponding corrected values; a dividing process section configured to divide a captured image into a plurality of partial images; a histogram creating section configured to create a histogram representing a distribution of the number of pixels for density values with respect to each color component of each of the partial images; an adjustment value determining section configured to determine, for each of the partial images, an adjustment value based on a peak in the histogram; a tone correction data generating section configured to generate, for each of the partial images, tone correction data by replacing a specific input value of the input values of the reference data with the adjustment value; and a correction process section configured to generate a corrected image by tone-correcting each of the partial images with use of the tone correction data.

With the arrangement, a specific input value out of a plurality of input values of reference data is replaced with an adjustment value obtained from the histogram, so that tone correction data is generated. Then, using the tone correction data, tone correction is performed. A peak of the histogram is constituted by pixels at, for example, a page background portion of a partial image. Accordingly, by setting an input value at a point having ideal brightness and color in the page background portion of reference data to a specific input value, it is possible to tone-correct the page background portion so that the page background portion has an ideal density value. Furthermore, by tone-correcting each partial image, it is possible to correct local changes in color and luminance, i.e. it is possible to perform shading correction also in terms of color and luminance. Consequently, it is possible to realize an image processing apparatus capable of correcting a captured image to have a desired image quality.

The image processing apparatus in accordance with second aspect of the present invention is preferably the image forming apparatus, wherein the dividing process section determines whether each of the partial images requires the subdividing process or not based on information representing a distribution of density values at a plurality of portions of said each of the partial images, and when the dividing process section determines that said each of the partial images requires the subdividing process, the dividing process section further divides said each of the partial images into a plurality of partial images.

With the arrangement, even if there is sharp shading (change in shadow and color) in a certain partial image, it is possible to subdivide the partial image into partial regions having substantially the same image content. Consequently, even when each partial image is tone-corrected in the same manner, the correction does not cause unpleasantness.

The image processing apparatus in accordance with third aspect of the present invention is preferably the image processing apparatus, wherein the dividing process section carries out the subdividing process on each of the partial images until the dividing process section determines that none of the partial images requires the subdividing process.

With the arrangement, it is possible to subdue a partial change in shadow and color in details of an image.

The image processing apparatus in accordance with fourth aspect of the present invention is preferably the image processing apparatus, wherein the adjustment value determining section determines, as the adjustment value, a density value corresponding to a value obtained by multiplying the number of pixels at a peak in the histogram which peak is closest to a maximum density value by a predetermined coefficient.

Alternatively, the image processing apparatus in accordance with fifth aspect of the present invention is preferably the image processing apparatus, wherein the adjustment value determining section determines, as the adjustment value, a density value corresponding to a value obtained by multiplying the number of pixels at a maximum peak in the histogram by a predetermined coefficient.

A peak closest to a maximum density value or a peak at which the number of pixels is at maximum is highly likely to correspond to a page background portion of an image. Accordingly, with the arrangements, it is possible to tone-correct the page background portion to have an ideal density value.

The image processing apparatus in accordance with sixth aspect of the present invention is preferably the image processing apparatus, wherein the reference data represents correspondences between input values and their corresponding corrected values at a plurality of feature points on a tone correction curve obtained from a reference captured image obtained by capturing a reference chart under a standard illumination condition.

The image processing apparatus in accordance with seventh aspect of the present invention is preferably the image processing apparatus, wherein the specific input value is an input value corresponding to a pixel in a white page background portion in the reference captured image.

With the arrangement, it is possible to tone-correct a page background portion of a partial image to have a density value ideal for the page background portion. Consequently, it is possible to perform a background removal correction, a color fogging correction etc.

The image processing apparatus in accordance with eighth aspect of the present invention is preferably the image processing apparatus, further including: a verification section configured to determine that the adjustment value determined by the adjustment value determining section is inappropriate, upon meeting any one of following conditions: Condition A: a difference between the density value at the peak in the histogram and a density value corresponding to a value obtained by multiplying the number of pixels at the peak in the histogram by a predetermined coefficient is not less than a first threshold; Condition B: a difference between a maximum value and a minimum value of the adjustment value determined by the adjustment value determining section with respect to each color component is not less than a second threshold; and Condition C: a difference between the adjustment value for said each of the partial images and an adjustment value of a partial image neighboring said each of the partial images is not less than a third threshold; and an adjustment value changing section configured to change the adjustment value for said each of the partial images, which adjustment value determined by the adjustment value determining section has been determined as inappropriate by the verification section, the changing being made based on an adjustment value of another partial image which neighbors said each of the partial images and whose adjustment value has been determined as appropriate by the verification section, in a case where the adjustment value has been changed by the adjustment value changing section, the tone correction data generating section generating tone correction data based on the changed adjustment value.

In a region such as a photograph and a drawing or a region which highly probably has a locally achromatic background or a locally achromatic drawing, a density value at a peak of the histogram can be in a wide range. Accordingly, in a case where tone correction data is generated by replacing a specific input value with an adjustment value obtained from the peak of the histogram, there is a possibility that unintended tone correction is performed. A partial image which meets any of the Conditions A, B, and C is a region such as a photograph and a drawing or a region which highly probably has a locally achromatic background or a locally achromatic drawing. Accordingly, such a partial image is tone-corrected not based on the adjustment value obtained from the histogram but based on an adjustment value for a neighboring partial image whose adjustment value has been determined as appropriate. Consequently, a partial image of a region such as a photograph and a drawing or a region which highly probably has a locally achromatic background or a locally achromatic drawing can be tone-corrected in the same manner as in the case of a neighboring partial image, so that partial unintended tone correction is prevented.

The image processing apparatus in accordance with ninth aspect of the present invention is preferably the image processing apparatus, further including: an image-capturing section; and a display section configured to display an image captured by the image-capturing section and a corrected image generated by the correction process section.

With the arrangement, it is possible to perform, in the apparatus including the image-capturing section, appropriate tone correction on an image captured by the image-capturing section.

Note that the image processing apparatus may be realized by a computer. In this case, the present invention encompasses (i) a program which allows the image processing apparatus to be realized by a computer by causing the computer to function as each section of the image processing apparatus and (ii) a computer-readable storage medium in which the program is stored.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a captured image processing system in which a mobile terminal apparatus makes data communications with an image forming apparatus and/or an image display apparatus.

REFERENCE SIGNS LIST

100: Mobile terminal apparatus (image processing apparatus)
101: Image-capturing section
103: Image processing section
104: Communication section
105: Display section
106: Input section
107: Storage medium accessing section
108: Storage section
109: Control section
121: Image correction amount reading section (reference data obtaining section)
122: Dividing process section
123: Histogram creating section
124: Adjustment value calculating section (adjustment value determining section)
125: Verification section
126: Adjustment value interpolating section (adjustment value changing section)
127: Adjusting section (tone correction data generating section)
128: correction process section
200: Image forming apparatus
300: Image display apparatus

The invention claimed is:

1. An image processing apparatus, comprising:
an image capturing device;
a memory storing predetermined reference correction data for respective color channels obtained from reference tone correction curves used when images captured by the image capturing device are displayed or printed; and
a processor configured to:
read from the memory the predetermined reference correction data, the predetermined reference correction data representing correspondences between a plurality of input values and their corresponding corrected values at a plurality of feature points on a tone correction curve;
divide a captured image into a plurality of partial images;
create a histogram representing a distribution of the number of pixels for density values with respect to each color component of each of the partial images;
determine, for each of the partial images, an adjustment value based on a peak in the histogram;
generate, for each of the partial images, tone correction data by replacing a specific input value out of the input values of the predetermined reference correction data with the adjustment value; and
improve the captured image by performing tone correction on each of the partial images using the generated tone correction data.

2. The image processing apparatus as set forth in claim 1, wherein dividing the captured image into a plurality of partial images further includes:
determining whether each of the partial images requires a subdividing process or not based on information representing a distribution of density values at a plurality of portions of said each of the partial images, and
dividing said each of the partial images into a plurality of partial images when each of the partial images requires the subdividing process.

3. The image processing apparatus as set forth in claim 2, wherein the subdividing process on each of the partial images is carried out until none of the partial images require the subdividing process.

4. The image processing apparatus as set forth in claim 1, wherein the adjustment value determining section determines, as the adjustment value, a density value corresponding to a value obtained by multiplying the number of pixels at a peak in the histogram which peak is closest to a maximum density value by a predetermined coefficient.

5. The image processing apparatus as set forth in claim 1, wherein determining the adjustment value based on a peak in the histogram includes determining a density value corresponding to a value obtained by multiplying the number of pixels at a maximum peak in the histogram by a predetermined coefficient.

6. The image processing apparatus as set forth in claim 1, wherein the reference data represents correspondences between input values and their corresponding corrected values at a plurality of feature points on a tone correction curve obtained from a reference captured image obtained by capturing a reference chart under a standard illumination condition.

7. The image processing apparatus as set forth in claim 6, wherein the specific input value is an input value corresponding to a pixel in a white page background portion in the reference captured image.

8. The image processing apparatus as set forth in claim 1, further comprising:
determining that the adjustment value is inappropriate, upon meeting any one of following conditions:
Condition A: a difference between the density value at the peak in the histogram and a density value corresponding to a value obtained by multiplying the number of pixels at the peak in the histogram by a predetermined coefficient is not less than a first threshold;
Condition B: a difference between a maximum value and a minimum value of the adjustment value determined by the adjustment value determining section with respect to each color component is not less than a second threshold; and
Condition C: a difference between the adjustment value for said each of the partial images and an adjustment value of a partial image neighboring said each of the partial images is not less than a third threshold; and
changing the adjustment value for said each of the partial images, which adjustment value has been determined as inappropriate, the changing being made based on an adjustment value of another partial image which neighbors said each of the partial images and whose adjustment value has been determined as appropriate, in a case where the adjustment value has been changed, generating tone correction data based on the changed adjustment value.

9. The image processing apparatus as set forth in claim 1, wherein the processor is further configured to:

display the captured image and a corrected image.

10. A non-transitory computer-readable storage medium in which a program, is stored, for causing the image processing apparatus as set forth in claim 1 to operate, the program causing a computer to execute the processor steps.

* * * * *